(12) United States Patent
Xue et al.

(10) Patent No.: US 10,862,817 B2
(45) Date of Patent: Dec. 8, 2020

(54) CONGESTION CONTROL METHOD, APPARATUS, AND SYSTEM

(71) Applicants: Huawei Technologies Co., Ltd., Shenzhen (CN); University of Science and Technology of China, Hefei (CN)

(72) Inventors: Kaiping Xue, Hefei (CN); Wenjia Wei, Hefei (CN); Qing Xu, Shanghai (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 2 days.

(21) Appl. No.: 16/357,564

(22) Filed: Mar. 19, 2019

(65) Prior Publication Data

US 2019/0215276 A1    Jul. 11, 2019

Related U.S. Application Data

(63) Continuation of application No. PCT/CN2016/099466, filed on Sep. 20, 2016.

(51) Int. Cl.
*H04L 12/891* (2013.01)
*H04L 12/801* (2013.01)
(Continued)

(52) U.S. Cl.
CPC .............. *H04L 47/41* (2013.01); *H04L 45/24* (2013.01); *H04L 47/11* (2013.01); *H04L 47/115* (2013.01);
(Continued)

(58) Field of Classification Search
CPC ....... H04L 47/41; H04L 47/193; H04L 47/11; H04L 47/2482; H04L 47/115; H04L 45/24; H04L 43/0829; H04L 43/0852
(Continued)

(56) References Cited

U.S. PATENT DOCUMENTS 9,391,911 B1 *   7/2016  Anderson .............. H04L 1/1628
2010/0246400 A1 *  9/2010  Onishi .................... H04L 47/28
370/235

(Continued)

FOREIGN PATENT DOCUMENTS

CN     102318312 A     1/2012
CN     103581035 A     2/2014
(Continued)

OTHER PUBLICATIONS

Ferlin et al., "Revisiting Congestion Control for MultipathTCP with Shared Bottleneck Detection," IEEE Infocom 2016—The 35th Annual IEEE International Conference on Computer Communications, XP032930233, pp. 1-9, Institute of Electrical and Electronics Engineers, New York, New York (Apr. 2016).

(Continued)

*Primary Examiner* — Phong La
(74) *Attorney, Agent, or Firm* — Leydig, Voit & Mayer, Ltd.

(57) ABSTRACT

Embodiments of the present disclosure provide a congestion control method, an apparatus, and a system. The method includes receiving, by a first device, an acknowledgement packet that is from a second device and that includes an ECE identifier. Based on an indication of the ECE identifier the first device starts monitoring a plurality of sub streams on a plurality of transmission paths between the first device and the second device, and grouping, into one set, sub streams that meet a congestion control condition. Additionally, intra-set congestion control is performed on the sub streams in the set. Separately congestion control is performed on a sub stream that is not in the set. The congestion control method is applied to a scenario in which data transmission is performed between the first device and the second device by using the MPTCP.

6 Claims, 9 Drawing Sheets

(51) Int. Cl.
*H04L 12/707* (2013.01)
*H04L 12/807* (2013.01)
*H04L 12/851* (2013.01)
*H04L 12/26* (2006.01)

(52) U.S. Cl.
CPC ........ *H04L 47/193* (2013.01); *H04L 47/2483* (2013.01); *H04L 47/27* (2013.01); *H04L 43/0829* (2013.01); *H04L 43/0852* (2013.01)

(58) Field of Classification Search
USPC .......................................................... 370/236
See application file for complete search history.

(56) References Cited

U.S. PATENT DOCUMENTS

| | | | |
|---|---|---|---|
| 2011/0292801 A1 | 12/2011 | Turnbull et al. | |
| 2012/0054583 A1* | 3/2012 | Park ................... | H03M 13/6306 714/776 |
| 2013/0182567 A1* | 7/2013 | Scheffenegger ........ | H04L 47/12 370/231 |
| 2014/0164641 A1* | 6/2014 | Ye ........................... | H04L 47/11 709/235 |
| 2015/0043345 A1* | 2/2015 | Testicioglu ............. | H04L 47/24 370/232 |
| 2015/0085665 A1* | 3/2015 | Kompella ............... | H04L 47/20 370/236 |
| 2015/0138978 A1* | 5/2015 | Ishikawa ................. | H04L 45/74 370/235 |
| 2016/0014030 A1* | 1/2016 | Thyni ................... | H04L 47/115 370/237 |
| 2016/0088645 A1* | 3/2016 | Burhan ................. | H04W 72/02 370/349 |
| 2017/0180261 A1* | 6/2017 | Ma ........................ | H04L 5/0055 |
| 2017/0366374 A1* | 12/2017 | Osuga .................... | H04L 47/14 |
| 2018/0220325 A1* | 8/2018 | Lee ....................... | H04W 72/10 |

FOREIGN PATENT DOCUMENTS

| | | |
|---|---|---|
| CN | 103973587 A | 8/2014 |
| CN | 104796350 A | 7/2015 |
| WO | 2015174901 A1 | 11/2015 |

OTHER PUBLICATIONS

Braden et al., "Recommendations on Queue Management and Congestion Avoidance in the Internet," RFC 2309, The Internet Society, XP055604783, Internet Engineering Task Force, Reston, Virginia (Apr. 1998).

Floyd et al.,"Random Early Detection Gateways for Congestion Avoidance," IEEE/ACM Transactions on Networking vol. 1, No. 4, pp. 1-22, Institute of Electrical and Electronics Engineers, New York, New York (Aug. 1993).

Hassayoun et al., "Dynamic Window Coupling for Multipath Congestion Control," Proceedings of the 19th IEEE International Conference on Network Protocols (ICNP), pp. 1-12, Institute of Electrical and Electronics Engineers, New York, New York (2011).

Xue et al.,"Migrating Unfairness Among Subflows in MPTCP With Network Coding for Wired-Wireless Networks", IEEE Transactions on Vehicular Technology, vol. 66, No. 1, pp. 798-809, Institute of Electrical and Electronics Engineers, New York, New York (Jan. 2017).

Ramakrishnan et al., "The Addition of Explicit Congestion Notification (ECN) to IP," Request for Comments:3168, pp. 1-63 (Sep. 2001).

Xu et al.,"Delay-based Congestion Control for MPTCP; draft-xu-mptcp-congestion-control-04.txt," Multipath TCP, Internet Draft, Intended status: Standard Track (Jul. 3, 2016).

Alizadeh et al., "Data Center TCP (DCTCP)," SIGCOMM ACM, New Delhi, India (Aug. 30-Sep. 3, 2010).

Raiciu et al.,"Coupled Congestion Control for Multipath Transport Protocols," Request for Comments: 6356, ISSN: 2070-1721, Internet Engineering Task Force, Reston, Virginia (Oct. 2011).

\* cited by examiner

CONGESTION CONTROL METHOD, APPARATUS, AND SYSTEM

CROSS-REFERENCE TO RELATED APPLICATIONS

This application is a continuation of International Application No. PCT/CN2016/099466, filed on Sep. 20, 2016, the disclosure of which is hereby incorporated by reference in its entirety.

TECHNICAL FIELD

The present disclosure relates to the field of communications technologies, and in particular, to a congestion control method, an apparatus, and a system.

BACKGROUND

In a communications system, the Multipath Transmission Control Protocol (MPTCP) can implement multipath parallel data transmission.

Currently, to improve a throughput during data transmission performed by using the MPTCP, when data transmission is performed between a transmit end and a receive end by using the MPTCP, congestion control (for example, adjusting bandwidth occupied by each sub stream) needs to be performed on a plurality of data streams (a data stream transmitted on each transmission path is referred to as a sub data stream, hereinafter referred to as a sub stream) transmitted on a plurality of transmission paths (a connection over which data transmission is performed by using the plurality of transmission paths may be referred to as an MPTCP connection) between the transmit end and the receive end. When congestion control is performed on the plurality of data streams, to ensure fairness between an MPTCP connection and a Transmission Control Protocol (TCP) connection (when data transmission is performed between the transmit end and the receive end by using the TCP, a connection over which data transmission is performed between the transmit end and the receive end by using a single transmission path is referred to as a TCP connection) in a network, a throughput of each MPTCP connection usually needs to be equal to a throughput of each TCP connection.

However, a plurality of sub streams are transmitted on each MPTCP connection, and possibly only some of the plurality of sub streams share bandwidth. If congestion control is simultaneously performed on the plurality of sub streams according to the foregoing method, because it can be only ensured that a throughput of each MPTCP connection is equal to a throughput of each TCP connection, a throughput of the MPTCP connection may not be significantly improved.

SUMMARY

This application provides a congestion control method, an apparatus, and a system, to significantly improve a congestion control effect.

To achieve the foregoing objective, this application uses the following technical solutions.

According to a first aspect, a congestion control method is provided. The method is applied to a process in which data transmission is performed between a first device and a second device by using the MPTCP. The method may include: receiving, by the first device, a first acknowledgement packet that is from the second device and that includes an explicit congestion notification echo (ECE) identifier used to instruct the first device to perform congestion control, where the first acknowledgement packet is an acknowledgement packet of a first data packet of a first sub stream in a plurality of data streams (hereinafter referred to as a plurality of sub streams) transmitted on a plurality of transmission paths between the first device and the second device; determining, by the first device based on indication of the ECE identifier, a first sub stream set that includes the first sub stream and a plurality of second sub streams that meet a congestion control condition in sub streams other than the first sub stream in the plurality of sub streams; and performing congestion control on sub streams in the first sub stream set.

In this application, the first device may use a set congestion control method to perform congestion control on the sub streams in the first sub stream set.

In the congestion control method provided in this application, when data transmission is performed between the first device and the second device by using the MPTCP, the first device may group, into one sub stream set, sub streams that meet the congestion control condition in the plurality of sub streams transmitted on the plurality of transmission paths between the first device and the second device. These sub streams that meet the congestion control condition may be bandwidth-shared sub streams to a specific degree. To be specific, in this application, a plurality of bandwidth-shared sub streams can be grouped into one sub stream set to a specific degree, and then congestion control can be performed on the sub streams in the set. In this way, a congestion control effect can be significantly improved, to further improve MPTCP transmission performance.

In a first optional implementation of the first aspect, after the determining, by the first device, a first sub stream set, and before the performing, by the first device, congestion control on sub streams in the first sub stream set, the congestion control method provided in this application may further include: receiving, by the first device, a second acknowledgement packet that is of a data packet (hereinafter referred to as a second data packet) of a sub stream in the first sub stream set, that is from the second device, and that includes the ECE identifier; determining, based on indication of the ECE identifier, a second sub stream set including the sub stream, where the second sub stream set is a subset of the first sub stream set; and performing congestion control on sub streams in the second sub stream set.

In this application, the first device may use the set congestion control method to perform congestion control on the sub streams in the second sub stream set.

In this application, after the first device determines the first sub stream set, the first device may further determine the second sub stream set from the first sub stream set, and perform congestion control on the sub streams in the second sub stream set. In this way, the first device can determine, in relatively high accuracy, a sub stream set on which congestion control is to be performed, so that a congestion control effect can be significantly improved.

In a second optional implementation of the first aspect, the congestion control method provided in this application may further include: performing, by the first device, congestion control on a sub stream (hereinafter referred to as a sub stream that is not in the first sub stream set) that is other than the sub streams in the first sub stream set and that is in the plurality of sub streams.

In this application, the first device may specifically use a separate congestion control method to perform congestion control on the sub stream that is not in the first sub stream set.

In this application, the first device may perform congestion control on the sub streams in the first sub stream set, and may further perform congestion control on the sub stream that is not in the first sub stream set. In this way, the first device may perform congestion control on all of the plurality of sub streams transmitted on the plurality of transmission paths between the first device and the second device, so that a congestion control effect can be more significantly improved.

In a third optional implementation of the first aspect, the congestion control method provided in this application may further include: performing, by the first device, congestion control on a sub stream (hereinafter referred to as a sub stream that is not in the second sub stream set) that is other than the sub streams in the second sub stream set and that is in the plurality of sub streams.

The first device may specifically use the separate congestion control method to perform congestion control on the sub stream that is not in the second sub stream set.

In this application, the first device may perform congestion control on the sub streams in the second sub stream set, and may further perform congestion control on the sub stream that is not in the second sub stream set. In this way, the first device may perform congestion control on all of the plurality of sub streams transmitted on the plurality of transmission paths between the first device and the second device, so that a congestion control effect can be more significantly improved.

In a fourth optional implementation of the first aspect, a method for determining, by the first device, the first sub stream set based on indication of the ECE identifier may include: monitoring, by the first device, the sub streams other than the first sub stream in the plurality of sub streams in a preset time period based on indication of the ECE identifier; determining, as the plurality of second sub streams, sub streams that meet the congestion control condition in the sub streams other than the first sub stream in the plurality of sub streams; and determining the first sub stream and the plurality of second sub streams as the first sub stream set.

In this application, by monitoring the sub streams other than the first sub stream in the plurality of sub streams in the preset time period, the first device may learn congestion statuses of the plurality of sub streams on the plurality of transmission paths between the first device and the second device, and group, into the first sub stream set, the sub streams that meet the congestion control condition. These sub streams that meet the congestion control condition may be bandwidth-shared sub streams to a specific degree. To be specific, in this application, a plurality of bandwidth-shared sub streams can be grouped into one sub stream set to a specific degree, and congestion control can be performed on the sub streams in the sub stream set. In this way, a congestion control effect can be significantly improved.

In a fifth optional implementation of the first aspect, a method for determining, by the first device, the second sub stream set based on indication of the ECE identifier may include: monitoring, by the first device in the preset time period based on indication of the ECE identifier, sub streams in the first sub stream set that are other than a third sub stream in which the second data packet is located in the set; determining, as a plurality of fourth sub streams, sub streams that meet the congestion control condition in the sub streams other than the third sub stream in the first sub stream set; and determining the third sub stream and the plurality of fourth sub streams as the second sub stream set.

In this application, the first device may monitor the sub streams other than the third sub stream in the first sub stream set in the preset time period, and determine, as the second sub stream set, the third sub stream and the sub streams that meet the congestion control condition in these sub streams.

In a sixth optional implementation of the first aspect, before the first device sends a data packet to a routing device, the congestion control method provided in this application may further include: marking, by the first device, the to-be-sent data packet.

Before sending the data packet to the routing device, the first device may first mark the to-be-sent data packet, to be specific, set an ECN identifier of the data packet to an ECN-supported identifier. The ECN identifier is used to indicate, to the routing device, that the data packet supports an ECN function. Then, the routing device sends the data packet with the ECN identifier to the second device. After receiving the data packet, the second device sends, to the first device, an acknowledgement packet (for example, the first acknowledgement packet or the second acknowledgement packet) for which an ECE identifier is set. After receiving the acknowledgement packet, the first device may learn that a sub stream in which the data packet is located may be congested, and determine, from the plurality of sub streams based on indication of the ECE identifier in the acknowledgement packet based on the congestion control condition, sub streams (for example, the sub streams in the first sub stream set or the sub streams in the second sub stream set) that may be congested, so that the first device implements congestion control on these sub streams that may be congested.

According to a second aspect, a congestion control method is provided. The method is applied to a process in which data transmission is performed between a first device and a second device by using the MPTCP. The method may include: receiving, by a routing device, a first data packet from the first device; determining, by the routing device, that an average queue length of a data packet queue (the data packet queue includes a data packet that is to be from the routing device) is greater than or equal to a first preset threshold and is less than or equal to a second preset threshold; making a congestion mark for the first data packet, and adding the first data packet to the data packet queue; and successively sending data packets in the data packet queue to the second device.

In the congestion control method provided in this application, when data transmission is performed between the first device and the second device by using the MPTCP, after receiving the first data packet from the first device, the routing device may make the congestion mark for the data packet that may encounter congestion, and then send the first data packet to the second device. After receiving the first data packet with the congestion mark, the second device makes an ECE mark for a first acknowledgement packet with which the second device is to reply to the first device. Therefore, after the first device receives the first acknowledgement packet including the ECE identifier, the first device may group, into one sub stream set, sub streams that meet a congestion control condition in a plurality of sub streams transmitted on a plurality of transmission paths between the first device and the second device. These sub streams that meet the congestion control condition may be bandwidth-shared sub streams to a specific degree. To be specific, in this application, a plurality of bandwidth-shared sub streams can be grouped into one sub stream set to a specific degree, and congestion control can be performed on the sub streams in the sub stream set. In this way, a congestion control effect can be significantly improved, to further improve MPTCP transmission performance.

In a first optional implementation of the second aspect, the congestion control method provided in this application may further include: receiving, by the routing device, a second data packet from the first device; determining, by the routing device, that an average queue length of a data packet queue (the data packet queue includes a data packet that is to be from the routing device) is greater than or equal to the first preset threshold and is less than or equal to the second preset threshold; making a congestion mark for the second data packet, and adding the second data packet to the data packet queue; and successively sending data packets in the data packet queue to the second device.

In this application, the first device sends a plurality of data packets to the routing device. The second data packet is a data packet of a sub stream in a first sub stream set. After receiving the second data packet from the first device, the routing device may make the congestion mark for the data packet that may encounter congestion, and then send the second data packet to the second device. After receiving the second data packet with the congestion mark, the second device makes an ECE mark for a second acknowledgement packet with which the second device is to reply to the first device. Therefore, after the first device receives the second acknowledgement packet including the ECE identifier, the first device may group, into a second sub stream set, sub streams that meet the congestion control condition in the first sub stream set. In other words, the first device may further determine the second sub stream set (the second sub stream set is a subset of the first sub stream set) from the first sub stream set. In this way, the first device can determine, in relatively high accuracy, a sub stream set on which congestion control is to be performed, so that a congestion control effect can be significantly improved.

According to a third aspect, a congestion control method is provided. The method is applied to a process in which data transmission is performed between a first device and a second device by using the MPTCP. The method may include: receiving, by the second device, a first data packet from a routing device; making an ECE mark for a first acknowledgement packet with which the second device is to reply to the first device; and sending the first acknowledgement packet to the first device.

In the congestion control method provided in this application, when data transmission is performed between the first device and the second device by using the MPTCP, after the second device receives the first data packet from the first device by using the routing device, the second device may set, in the first acknowledgement packet with which the second device is to reply to the first device, an ECE identifier used to notify the first device that a sub stream in which the first data packet is located may be congested. The ECE identifier is an echo identifier that is set by the second device for an ECN identifier in the data packet received by the second device. Therefore, after the first device receives the first acknowledgement packet including the ECE identifier, the first device may group, into one sub stream set, sub streams that meet a congestion control condition in a plurality of sub streams transmitted on a plurality of transmission paths between the first device and the second device. These sub streams that meet the congestion control condition may be bandwidth-shared sub streams to a specific degree. To be specific, in this application, a plurality of bandwidth-shared sub streams can be grouped into one sub stream set to a specific degree, and congestion control can be performed on the sub streams in the sub stream set. In this way, a congestion control effect can be significantly improved, so that the first device can perform congestion control on a sub stream that may be congested.

In a first optional implementation of the third aspect, the congestion control method provided in this application may further include: receiving, by the second device, a second data packet from the routing device; making an ECE mark for a second acknowledgement packet with which the second device is to reply to the first device; and sending the second acknowledgement packet to the first device.

In this application, after the second device receives the second data packet from the first device by using the routing device, the second device may set, in the second acknowledgement packet with which the second device is to reply to the first device, an ECE identifier used to notify the first device that a sub stream in which the second data packet is located may be congested. The ECE identifier is an echo identifier that is set by the second device for an ECN identifier in the data packet received by the second device. Therefore, after the first device receives the second acknowledgement packet including the ECE identifier, the first device may group, into a second sub stream set, sub streams that meet the congestion control condition in a first sub stream set. In other words, the first device may further determine the second sub stream set (the second sub stream set is a subset of the first sub stream set) from the first sub stream set. In this way, the first device can determine, in relatively high accuracy, a sub stream set on which congestion control is to be performed, so that a congestion control effect can be significantly improved, to further improve MPTCP transmission performance.

According to a fourth aspect, a device is provided. The device includes a receiving module, a determining module, and a control module. The receiving module is configured to receive a first acknowledgement packet that is from a second device and that includes an ECE identifier used to instruct the device to perform congestion control, where the first acknowledgement packet is an acknowledgement packet of a first data packet of a first sub stream in a plurality of sub streams transmitted on a plurality of transmission paths between the first device and the second device. The determining module is configured to determine, based on indication of the ECE identifier, a first sub stream set that includes the first sub stream and a plurality of second sub streams that meet a congestion control condition in sub streams other than the first sub stream in the plurality of sub streams. The control module is configured to perform congestion control on sub streams in the first sub stream set.

In a first optional implementation of the fourth aspect, the receiving module may be further configured to: after the determining module determines the first sub stream set, and before the control module performs congestion control on the sub streams in the first sub stream set, receive a second acknowledgement packet that is of a data packet (hereinafter referred to as a second data packet) of a sub stream in the first sub stream set, that is from the second device, and that includes the ECE identifier. The determining module may be further configured to determine, based on indication of the ECE identifier, a second sub stream set including the sub stream, where the second sub stream set is a subset of the first sub stream set. The control module may be further configured to perform congestion control on sub streams in the second sub stream set.

In a second optional implementation of the fourth aspect, the control module may be further configured to perform congestion control on a sub stream (hereinafter referred to as a sub stream that is not in the first sub stream set) that is other than the sub streams in the first sub stream set and that is in the plurality of sub streams.

In a third optional implementation of the fourth aspect, the control module may be further configured to perform congestion control on a sub stream (hereinafter referred to as a sub stream that is not in the second sub stream set) that is other than the sub streams in the second sub stream set and that is in the plurality of sub streams.

In a fourth optional implementation of the fourth aspect, a method for determining, by the determining module, the first sub stream set based on indication of the ECE identifier may include: monitoring, by the determining module, the sub streams other than the first sub stream in the plurality of sub streams in a preset time period; determining, as the plurality of second sub streams, sub streams that meet the congestion control condition in the sub streams other than the first sub stream in the plurality of sub streams; and determining the first sub stream and the plurality of second sub streams as the first sub stream set.

In a fifth optional implementation of the fourth aspect, a method for determining, by the determining module, the second sub stream set based on indication of the ECE identifier may include: monitoring, by the determining module monitors in the preset time period, sub streams in the first sub stream set that are other than a third sub stream in which the second data packet is located in the set; determining, as a plurality of fourth sub streams, sub streams that meet the congestion control condition in the sub streams other than the third sub stream in the first sub stream set; and determining the third sub stream and the plurality of fourth sub streams as the second sub stream set.

In a sixth optional implementation of the fourth aspect, the determining module may be further configured to mark a to-be-sent data packet before the sending module sends the data packet to a routing device.

For technical effects of the fourth aspect or any optional implementation of the fourth aspect, refer to related descriptions of technical effects of the first aspect or any optional implementation of the first aspect. Details are not described herein again.

In the first aspect and the fourth aspect, the congestion control condition includes at least one of the following three conditions: a delay of a sub stream is greater than a preset delay threshold; a packet loss event occurs in the sub stream; and the receiving module receives an acknowledgement packet of a data packet of the sub stream, and the acknowledgement packet of the data packet of the sub stream includes the ECE identifier.

In this application, the three congestion control conditions can reflect congestion statuses of the plurality of sub streams transmitted on the plurality of transmission paths between the first device and the second device. Therefore, the routing device may determine, based on at least one of the three congestion control conditions, a sub stream that may be congested.

According to a fifth aspect, a routing device is provided. The routing device includes a receiving module, a determining module, and a sending module. The receiving module is configured to receive a first data packet from a first device. The determining module is configured to: determine that an average queue length of a data packet queue (the data packet queue includes a data packet to be from the routing device) is greater than or equal to a first preset threshold and is less than or equal to a second preset threshold; and make a congestion mark for the first data packet, and add the first data packet to the data packet queue, where the second preset threshold is greater than the first preset threshold. The sending module is configured to successively send data packets in the data packet queue to a second device.

In a first optional implementation of the fifth aspect, the receiving module is further configured to receive a second data packet from the first device. The determining module is further configured to: determine that an average queue length of a data packet queue (the data packet queue includes a data packet to be from the routing device) is greater than or equal to the first preset threshold and is less than or equal to the second preset threshold (the second preset threshold is greater than the first preset threshold); and make a congestion mark for the second data packet received by the receiving module, and add the second data packet to the data packet queue. The sending module is configured to successively send data packets (including the second data packet added by the determining module to the data packet queue) in the data packet queue to the second device.

For technical effects of the fifth aspect or any optional implementation of the fifth aspect, refer to related descriptions of technical effects of the second aspect or any optional implementation of the second aspect. Details are not described herein again.

In the second aspect and the fifth aspect, the first preset threshold may be determined by using the following formula: $K_1 \geq \frac{1}{7} C*RTT$, where $K_1$ is the first preset threshold, C is a capacity of a link between the first device and the second device (namely, a maximum value of a data stream that can be transmitted on the link), and a round-trip time (RTT) is a round trip delay of a sub stream (namely, any one of a plurality of sub streams transmitted on the link) transmitted on the link.

The second preset threshold may be determined by using the following formula: $K_2 \geq 2*K_1$, where $K_2$ is the second preset threshold.

In this application, the capacity of the link and the round trip delay of the sub stream transmitted on the link can reflect a length of a data packet queue of the routing device. Therefore, when the first preset threshold is calculated with reference to the capacity of the link and the round trip delay of the sub stream transmitted on the link, the routing device can more accurately determine whether the sub stream in which the first data packet is located is congested.

According to a sixth aspect, a device is provided. The device includes a receiving module, a determining module, and a sending module. The receiving module is configured to receive a first data packet from a routing device. The determining module is configured to make an ECE mark for a first acknowledgement packet with which the second device is to reply to a first device (namely, an acknowledgement packet with which the second device is to reply to the first data packet received by the receiving module). The sending module is configured to send the first acknowledgement packet marked by the determining module to the first device.

In a first optional implementation of the sixth aspect, the receiving module is further configured to receive a second data packet from the routing device. The determining module is further configured to make an ECE mark for a second acknowledgement packet with which the second device is to reply to the first device (namely, an acknowledgement packet with which the second device is to reply to the second data packet received by the receiving module). The sending module is further configured to send the second acknowledgement packet marked by the determining module to the first device.

For technical effects of the sixth aspect or any optional implementation of the sixth aspect, refer to related descriptions of technical effects of the third aspect or any optional implementation of the third aspect. Details are not described herein again.

According to a seventh aspect, a device is provided. The device includes a processor, a transceiver, and a memory. The memory is configured to store a computer execution instruction. When the device runs, the processor executes the computer execution instruction stored in the memory, so that the device performs the congestion control method according to the first aspect.

According to an eighth aspect, a computer-readable storage medium is provided. The computer-readable storage medium stores one or more programs. The one or more programs include a computer execution instruction. When a processor of a device executes the computer execution instruction, the device performs the congestion control method according to the first aspect or any optional manner of the first aspect.

For technical effects of the seventh aspect and the eighth aspect, refer to related descriptions of technical effects of the first aspect or any optional implementation of the first aspect. Details are not described herein again.

According to a ninth aspect, a routing device is provided. The routing device includes a processor, a transceiver, and a memory. The memory is configured to store a computer execution instruction. When the routing device runs, the processor executes the computer execution instruction stored in the memory, so that the routing device performs the congestion control method according to the second aspect.

According to a tenth aspect, a computer-readable storage medium is provided. The computer-readable storage medium stores one or more programs. The one or more programs include a computer execution instruction. When a processor of the routing device executes the computer execution instruction, the device performs the congestion control method according to the second aspect.

For technical effects of the ninth aspect and the tenth aspect, refer to related descriptions of technical effects of the second aspect or any optional implementation of the second aspect. Details are not described herein again.

According to an eleventh aspect, a device is provided. The device includes a processor, a transceiver, and a memory. The memory is configured to store a computer execution instruction. When the device runs, the processor executes the computer execution instruction stored in the memory, so that the device performs the congestion control method according to the third aspect.

According to a twelfth aspect, a computer-readable storage medium is provided. The computer-readable storage medium stores one or more programs. The one or more programs include a computer execution instruction. When a processor of the device executes the computer execution instruction, the device performs the congestion control method according to the third aspect.

For technical effects of the eleventh aspect and the twelfth aspect, refer to related descriptions of technical effects of the third aspect or any optional implementation of the third aspect. Details are not described herein again.

According to a thirteenth aspect, a communications system is provided. The communications system includes the device (namely, the first device in this application) according to the fourth aspect or any optional implementation of the fourth aspect, the routing device according to the fifth aspect or any optional implementation of the fifth aspect, and the device (namely, the second device in this application) according to the sixth aspect or any optional implementation of the sixth aspect. Data transmission is performed between the first device and the second device by using the routing device.

Alternatively, the communications system includes the device (namely, the first device in this application) according to the seventh aspect, the routing device according to the ninth aspect, and the device (namely, the second device in this application) according to the eleventh aspect. Data transmission is performed between the first device and the second device by using the routing device.

For technical effects of the thirteenth aspect, refer to related descriptions of technical effects of the fourth aspect or any optional implementation of the fourth aspect, the fifth aspect or any optional implementation of the fifth aspect, the sixth aspect or any optional implementation of the sixth aspect, the seventh aspect, the ninth aspect, and the eleventh aspect. Details are not described herein again.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure.

DESCRIPTION OF EMBODIMENTS

Figure 1:
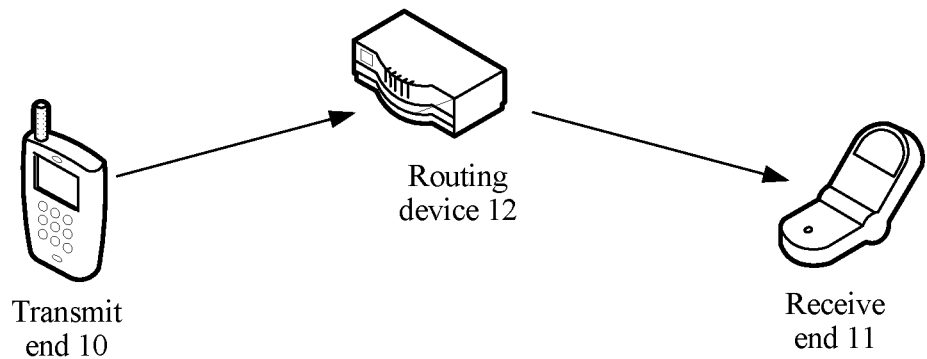
FIG. 1 is a schematic architectural diagram of a communications system according to an embodiment of the present disclosure.

The term "and/or" in this specification indicates only an association relationship for describing associated objects and indicates that three relationships may exist. For example, A and/or B may represent the following three cases: Only A exists, both A and B exist, and only B exists.

In the specification and claims of the present disclosure, the terms "first", "second", and the like are intended to distinguish between different objects, instead of describing a particular order of the objects. For example, a first device, a second device, and the like are intended to distinguish between different devices, instead of describing a particular order of the devices.

The term such as "example" or "for example" in the embodiments of the present disclosure means "giving an example, an illustration, or a description". Any embodiment or design solution described as "example" or "for example" in the embodiments of the present disclosure should not be explained as being more preferred or having more advantages than another embodiment or design solution. Exactly, use of the term such as "example" or "for example" is intended to present a related concept in a specific manner.

In the descriptions in the present disclosure, unless otherwise provided, "a plurality of" means "two or more". For example, a plurality of sub streams mean two or more sub streams.

The following describes in detail the technical solutions in the embodiments of the present disclosure with reference to the accompanying drawings in the embodiments of the present disclosure. Apparently, the described embodiments are merely some but not all of the embodiments of the present disclosure.

The following first explains some concepts in a congestion control method, an apparatus, and a system that are provided in the embodiments of the present disclosure.

The MPTCP is a transport layer protocol that can implement multipath parallel transmission. Multipath parallel data transmission can be implemented between a transmit end and a receive end by using the MPTCP. Specifically, there are a plurality of transmission paths between the transmit end and the receive end. Simultaneous data transmission can be performed between the transmit end and the receive end by using the plurality of transmission paths, in other words, a plurality of data streams (a data stream is hereinafter referred to as a sub stream) can be simultaneously transmitted between the transmit end and the receive end on the plurality of transmission paths. In this way, a network throughput can be improved when data transmission is performed between the transmit end and the receive end by using the MPTCP.

An explicit congestion notification (ECN) is a mechanism in which a data packet transmitted between a transmit end and a receive end can be marked, to indicate a congestion status of the data packet transmitted between the transmit end and the receive end. Specifically, the transmit end sets an ECN identifier of the data packet to a value used to indicate that the data packet supports an ECN function, and then sends the data packet to a routing device. After receiving the data packet, the routing device determines whether a sub stream in which the data packet is located is congested. If the sub stream in which the data packet is located is congested, the routing device sets the ECN identifier of the data packet to a value used to indicate that the sub stream in which the data packet is located is congested.

A method for determining, by the routing device, whether the sub stream in which the data packet is located is congested is described in detail in the following embodiments.

When data transmission is performed between the transmit end and the receive end by using the MPTCP, congestion control (for example, adjusting bandwidth occupied by each sub stream) usually needs to be performed on a plurality of data streams (a data stream transmitted on each transmission path is referred to as a sub data stream, hereinafter referred to as a sub stream) transmitted on a plurality of transmission paths (a connection over which data transmission is performed by using the plurality of transmission paths may be referred to as an MPTCP connection) between the transmit end and the receive end. To ensure fairness between an MPTCP connection and a TPC connection (when data transmission is performed between the transmit end and the receive end by using the TCP, a connection over which data transmission is performed between the transmit end and the receive end by using a single transmission path is referred to as a TCP connection) in a network, a throughput of each MPTCP connection usually needs to be equal to a throughput of each TCP connection. However, because a congested sub stream may share bandwidth with another sub stream in the plurality of sub streams, if congestion control is performed on the plurality of sub streams according to the foregoing method, a congestion control effect may not be significant.

To resolve the foregoing problem, the embodiments of the present disclosure provide a congestion control method, an apparatus, and a system. When data transmission is performed between a transmit end (namely, the following first device) and a receive end (namely, the following second device) by using the MPTCP, congestion control is performed on a plurality of sub streams transmitted on a plurality of transmission paths between the transmit end and the receive end. Specifically, the transmit end sends a first data packet (one of a plurality of data packets from the transmit end is referred to as the first data packet) to a routing device. After receiving the first data packet, the routing device determines that an average queue length of a data packet queue is greater than or equal to a first preset threshold and is less than or equal to a second preset threshold. Then, the routing device makes a congestion mark for the first data packet, and sends the first data packet to the receive end. After receiving the first data packet with the congestion mark, the receive end sets an ECE identifier in a first acknowledgement packet (namely, an acknowledgement packet of the first data packet) with which the receive end is to reply to the transmit end, and then sends the first acknowledgement packet to the transmit end. After the transmit end receives the first acknowledgement packet including the ECE identifier, the transmit end starts to monitor a plurality of sub streams that are other than a sub stream (hereinafter referred to as a first sub stream) in which the first data packet is located and that are in the plurality of sub streams transmitted on the plurality of transmission paths, groups, into one set, the first sub stream and sub streams (hereinafter referred to as a plurality of second sub streams) that meet a congestion control condition in the plurality of other sub streams, and then performs congestion control on sub streams in the set. In comparison with the prior art, in the embodiments of the present disclosure, sub streams that meet the congestion control condition in the plurality of sub streams transmitted on the plurality of transmission paths between the transmit end and the receive end may be grouped into one sub stream set. These sub streams that meet the congestion control condition may be bandwidth-shared sub streams to a specific degree (in comparison with a sub stream that is not bandwidth-shared, because bandwidth is limited, when one of bandwidth-shared sub streams is congested, the other bandwidth-shared sub streams are also very likely to be congested). Therefore, it may be considered, to a specific degree, that a sub stream that meets the congestion control condition is bandwidth-shared. To be specific, in the embodiments of the present disclosure, a plurality of bandwidth-shared sub streams can be grouped into one sub stream set to a specific degree, and congestion control can be performed on the sub streams in the sub stream set. In this way, a congestion control effect can be significantly improved, to further improve MPTCP transmission performance.

In the embodiments of the present disclosure, to accurately describe the transmit end and the receive end between which data transmission is performed by using the MPTCP, in all the following embodiments, the transmit end is referred to as the first device, and the receive end is referred to as the second device.

FIG. 1 is a schematic architectural diagram of a communications system according to an embodiment of the present disclosure. In the communications system, data transmission is performed between a first device (namely, a transmit end) and a second device (namely, a receive end) by using the MPTCP. As shown in FIG. 1, the communications system includes a first device 10, a second device 11, and a routing device 12. The routing device is connected to the first device and the second device. The first device sends, to the routing device, data that is to be from the first device; after receiving the data from the first device, the routing device sends the received data to the second device; and the second device receives the data from the routing device. In other words, data transmission between the first device and the second device is completed.

It should be noted that, the first device and the second device may be terminal devices such as mobile phones, tablet computers, notebook computers, ultra-mobile personal computers (UMPC), netbooks, or personal digital assistants (PDA). The routing device may be a router or the like.

Figure 2:
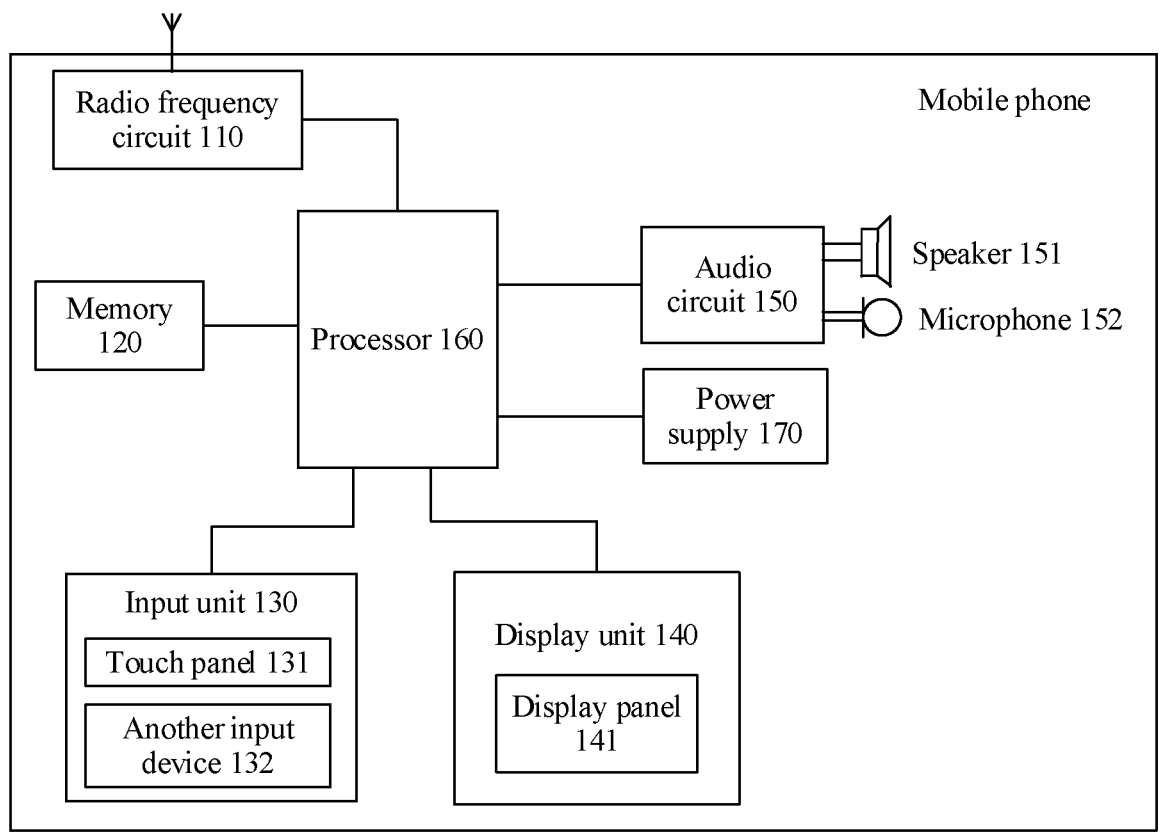
FIG. 2 is a schematic hardware diagram of a mobile phone according to an embodiment of the present disclosure.

In this embodiment of the present disclosure, an example in which the first device is a mobile phone is used to illustrate a hardware structure of the first device. FIG. 2 is a schematic hardware diagram of a mobile phone according to an embodiment of the present disclosure. As shown in FIG. 2, the mobile phone provided in this embodiment of the present disclosure includes components such as a radio frequency (RF) circuit 110, a memory 120, an input unit 130, a display unit 140, an audio circuit 150, a processor 160, and a power supply 170. The components of the mobile phone are illustrated below.

The RF circuit 110 is configured to receive and send signals in an information sending and receiving process or a call process. The RF circuit 110 may further communicate with a network and another device through wireless communication. The RF circuit usually includes but is not limited to an antenna, at least one amplifier, a transceiver, a coupler, a low noise amplifier (LNA), a duplexer, and the like.

The memory 120 is configured to store a software program and a module. The memory 120 mainly includes a program storage area and a data storage area. The program storage area may store an operating system, an application program required by at least one function (for example, a sound playing function and an image playing function), and the like. The data storage area may store data (for example, audio data and an address book) and the like created based on use of the mobile phone. In addition, the memory 120 may include a high-speed random access memory, and may further include a nonvolatile memory, for example, at least one magnetic disk storage component, a flash memory component, or another nonvolatile solid-state storage component.

The input unit 130 is configured to: receive entered digit or character information, and generate key signal input related to user settings and function control of the mobile phone. Specifically, the input unit 130 may include a touch panel 131 and another input device 132. The touch panel 131 is also referred to as a touch-control panel, and may collect a touch operation performed by a user on or near the touch panel 131 (for example, an operation performed by the user on the touch panel 131 or near the touch panel 131 by using any proper object or accessory such as a finger or a stylus), and drive a corresponding connection apparatus based on a preset program. The input unit 130 may further include the another input device 132 in addition to the touch panel 131. Specifically, the another input device 132 may include but is not limited to one or more of a physical keyboard, a function key (such as a volume control key or a power on/off key), a trackball, a mouse, a joystick, or the like.

The display unit 140 is configured to display information entered by the user or information provided for the user, and various menus of the mobile phone. The display unit 140 may include a display panel 141. Optionally, the display panel 141 may be configured in a form of a liquid crystal display (LCD), an organic light-emitting diode (OLED), or the like.

The audio circuit 150 is configured to convert received audio data into an electrical signal, and transmit the electrical signal to a speaker 151; and the speaker 151 converts the electrical signal into a sound signal, and outputs the sound signal to a microphone 152. In addition, the microphone 152 converts a collected sound signal into an electrical signal; and the audio circuit 150 converts the electrical signal into audio data after receiving the electrical signal, and then outputs the audio data to the RF circuit 110 to send the audio data to, for example, another mobile phone, or outputs the audio data to the memory 120 for further processing. The processor 160 is configured to implement various functions of the mobile phone 100 and data processing by running or executing the software program and/or the module that are/is stored in the memory 120 and by invoking the data stored in the memory 120, to perform overall monitoring on the mobile phone.

The power supply 170 is configured to supply power to the components such as a battery of the mobile phone. Optionally, the power supply may be logically connected to the processor 160 by using a power management system, to implement functions such as charging management, discharging management, and power consumption management by using the power management system.

Both the first device and the second device that are provided in this embodiment of the present disclosure are terminal devices, in other words, the second device provided in this embodiment of the present disclosure may also be a mobile phone. Therefore, for a schematic hardware diagram of the second device provided in this embodiment of the present disclosure, refer to the schematic hardware diagram of the mobile phone shown in FIG. 2. Details are not described herein again.

Figure 3:
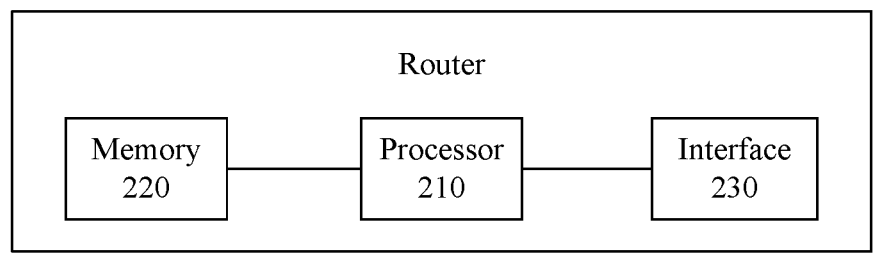
FIG. 3 is a schematic hardware diagram of a router according to an embodiment of the present disclosure.

In this embodiment of the present disclosure, an example in which the routing device is a router is used to illustrate a hardware structure of the routing device. FIG. 3 is a schematic hardware diagram of a router according to an embodiment of the present disclosure. As shown in FIG. 3, the router provided in this embodiment of the present disclosure includes components such as a processor 210, a memory 220, and an interface 230. The components of the router are illustrated below.

The processor 210 is configured to be responsible for exchanging routing information, searching a routing table, and forwarding a data packet, for example, processing and maintaining various tables required by the router and routing computing.

The memory 220 is configured to store a configuration, an operating system, routing protocol software, and the like of the router. The router may have a plurality of memories, for example, a read-only memory (ROM), a random access memory (RAM), a dynamic random access memory (DRAM), and a flash. The interface 230 is used by the router to send and receive data packets. The interface 230 in the router includes a local area network interface and a wide area network interface. In addition, the router has no input device or terminal display device. The interface in the router further includes a control port that is used by a user or an administrator to communicate with the router by using a terminal, to implement router configuration.

To more clearly understand the technical solutions in the embodiments of the present disclosure, the congestion control method provided in the embodiments of the present disclosure is illustrated below.

Figure 4:
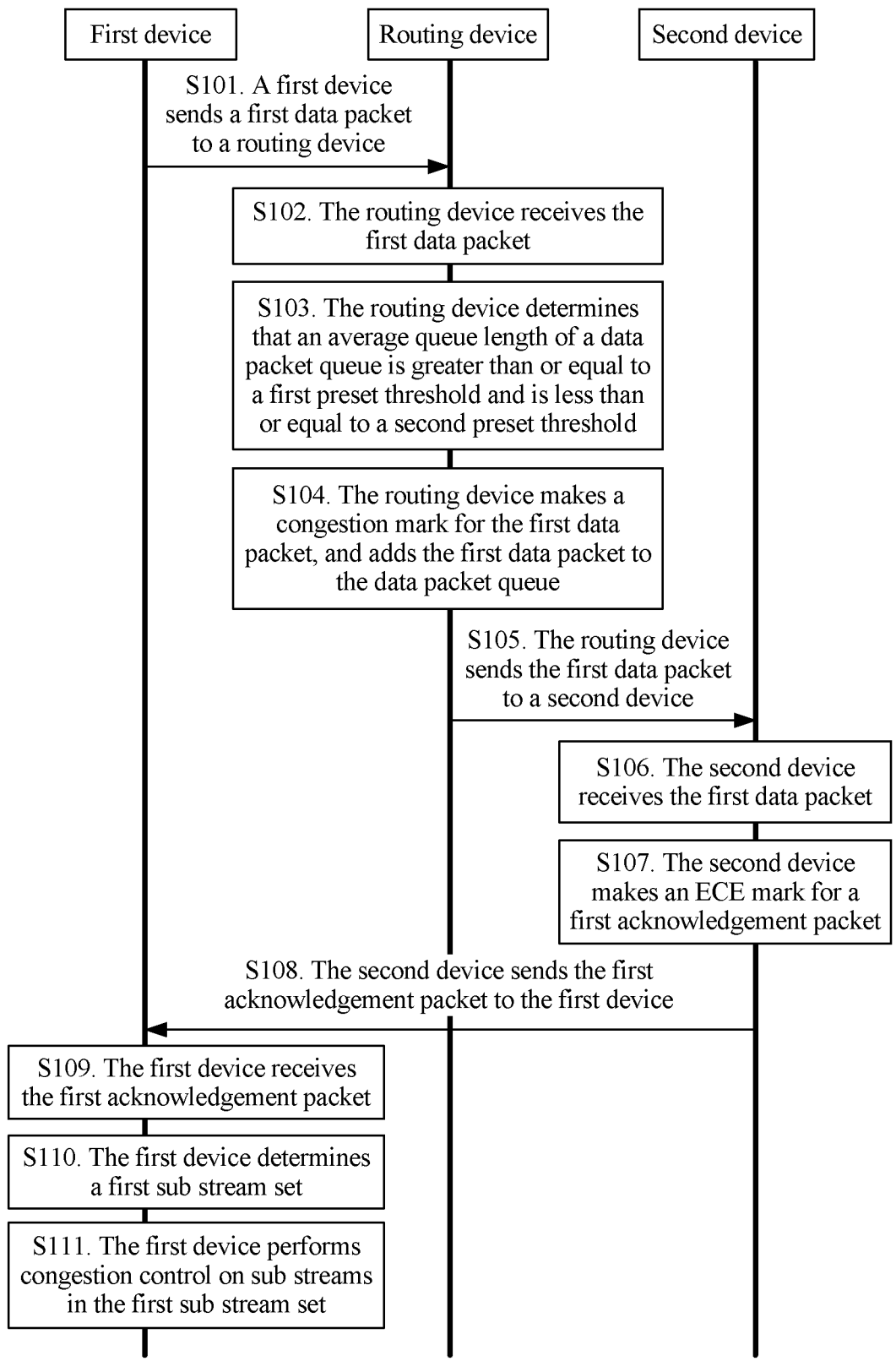
FIG. 4 is a schematic diagram 1 of a congestion control method according to an embodiment of the present disclosure.

With reference to FIG. 1, as shown in FIG. 4, an embodiment of the present disclosure provides a congestion control method. The method may include the following steps.

S101. A first device sends a first data packet to a routing device.

In this embodiment of the present disclosure, when data transmission is performed between the first device and a second device by using the MPTCP, the first device may successively send a plurality of to-be-transmitted data packets (the plurality of data packets constitute data from the first device to the second device) to the second device by using the routing device. The plurality of data packets from the first device to the second device include the first data packet. The routing device can select an optimal transmission path based on actual statuses of channels in a data transmission process, and send, in a data packet receiving order, data packets received by the routing device. Therefore, the routing device can be used as a forwarding device for data transmission between the first device and the second device, to implement data transmission between the first device and the second device.

It should be noted that, in this embodiment of the present disclosure, when the first device sends data packets to the routing device, the first device consecutively sends the data packets to the routing device in an order of the to-be-sent data packets (for example, the order may be an order of generating these data packets by the first device).

S102. The routing device receives the first data packet.

S103. The routing device determines that an average queue length of a data packet queue is greater than or equal to a first preset threshold and is less than or equal to a second preset threshold.

S104. The routing device makes a congestion mark for the first data packet, and adds the first data packet to the data packet queue.

In this embodiment of the present disclosure, after the routing device receives the first data packet from the first device, the routing device first calculates the average queue length of the data packet queue. When the average queue length of the data packet queue is less than the first preset threshold, it indicates that the current data packet queue of the routing device is not congested. In this case, the routing device adds the first data packet to the data packet queue, waiting for the routing device to forward the first data packet. When the average queue length of the data packet queue is greater than or equal to the first preset threshold and is less than or equal to the second preset threshold, it indicates that the current data packet queue of the routing device may be congested. In this case, the routing device makes the congestion mark for the first data packet, and then adds the first data packet to the data packet queue, waiting for the routing device to forward the first data packet. When the average queue length of the data packet queue is greater than the second preset threshold, it indicates that the current data packet queue of the routing device has been congested. In this case, the routing device discards the first data packet.

It should be noted that, each time the routing device receives a data packet from the first device, the routing device calculates an average queue length of a data packet queue once.

Optionally, a method for calculating the average queue length of the data packet queue by the routing device may be:

$$Q_{avg}' = (1-w) \times Q_{avg} + w \times Q$$

In the foregoing formula, $Q_{avg}'$ is an average queue length that is of a data packet queue and that is currently calculated by the routing device when the routing device receives the first data packet from the first device, $Q_{avg}$ is an average queue length that is of a data packet queue and that is calculated by the routing device when the routing device receives a previous data packet, w is a weight of the data packet queue, and Q is a length of a current data packet queue (namely, an actual length of the current data packet queue).

Optionally, a method for calculating the first preset threshold may be:

$$K_1 \geq \frac{1}{2} C * RTT$$

In the foregoing formula, $K_1$ is the first preset threshold, C is a capacity of a link between the first device and the second device (namely, a maximum value of a data stream that can be transmitted on the link), and RTT is a round trip delay of a sub stream transmitted on the link (namely, any one of a plurality of sub streams transmitted on the link).

Optionally, in this embodiment of the present disclosure, the RTT may be an average round trip delay of the plurality of sub streams transmitted on the link between the first device and the second device, and may be specifically determined based on an actual requirement. This is not limited in this embodiment of the present disclosure.

Optionally, a method for calculating the second preset threshold may be:

$$K_2 \geq 2 * K_1$$

In the foregoing formula, $K_2$ is the second preset threshold.

In this embodiment of the present disclosure, the capacity of the link and the round trip delay of the sub stream transmitted on the link can reflect a length of a data packet queue of the routing device. Therefore, when the first preset threshold is calculated with reference to the capacity of the link and the round trip delay of the sub stream transmitted on the link, the routing device can more accurately determine whether the first data packet encounters congestion.

In this embodiment of the present disclosure, after the routing device determines that the average queue length of the data packet queue is greater than or equal to the first preset threshold and is less than or equal to the second preset threshold, the routing device makes the congestion mark for the first data packet, so that when the routing device sends the first data packet to the second device, the second device can learn a congestion status of a sub stream in which the data packet received by the second device is located.

It should be noted that a method for making the congestion mark for the first data packet by the routing device may be specifically as follows: The routing device sets an ECN identifier for the first data packet, where the ECN identifier is used to notify the second device that the sub stream in which the first data packet received by the second device is located may be congested.

In this embodiment of the present disclosure, for a specific ECN identifier setting method, refer to related descriptions of an ECN identifier setting method in the RFC3168 standard in the prior art. Details are not described in this embodiment of the present disclosure.

In this embodiment of the present disclosure, the routing device may successively send data packets in the data packet queue to the second device. To better understand the congestion control method provided in the embodiments of the present disclosure, one data packet is used as an example in all the embodiments of the present disclosure to illustrate the congestion control solutions provided in the embodiments of the present disclosure. An example in which the first data packet or a second data packet is sent is used for illustration.

S105. The routing device sends the first data packet to a second device.

In this embodiment of the present disclosure, the routing device sends the data packets in the data packet queue to the second device. Specifically, the routing device sends the data packets in the current queue to the second device in an order of the data packets in the data packet queue.

It should be noted that, in this embodiment of the present disclosure, a speed at which the routing device receives a data packet from the first device may be greater than a speed at which the routing device forwards the data packet from the first device (in other words, the routing device sends, to the second device, the data packet from the first device). Therefore, when receiving data packets from the first device, the routing device adds these data packets to a data packet queue of the routing device in an order of receiving these data packets by the routing device. Then, the routing device successively sends data packets in the data packet queue to the second device according to a first in first out principle (in other words, the routing device first forwards an earlier received data packet).

S106. The second device receives the first data packet.

In this embodiment of the present disclosure, after the second device receives the first data packet, the second device needs to reply to the first device with an acknowledgement packet, namely, a first acknowledgement packet, of the first data packet.

S107. The second device makes an ECE mark for a first acknowledgement packet.

S108. The second device sends the first acknowledgement packet to the first device.

In this embodiment of the present disclosure, after the second device receives the first data packet from the routing device, the second device replies to the first device with the first acknowledgement packet of the first data packet. Specifically, the second device may set an ECE identifier in the first acknowledgement packet to notify the first device that congestion control needs to be performed. The ECE identifier is an echo identifier of the ECN identifier in the first data packet received by the second device. The ECE identifier is used to notify the first device that the sub stream (may be referred to as a first sub stream in this embodiment of the present disclosure) in which the first data packet is located may be congested in this case, so that the first device can perform congestion control on these sub streams that may be congested. For a specific ECE identifier setting method, refer to related descriptions of an ECE identifier setting method in the RFC3168 standard in the prior art. Details are not described in this embodiment of the present disclosure.

S109. The first device receives the first acknowledgement packet.

In this embodiment of the present disclosure, after the first device receives the first acknowledgement packet from the second device, the first device may learn that the first sub stream in which the first data packet is located may be congested, in other words, the first device needs to process such congestion.

S110. The first device determines a first sub stream set based on indication of an ECE identifier in the first acknowledgement packet.

In this embodiment of the present disclosure, the first sub stream set includes the first sub stream and sub streams (hereinafter referred to as a plurality of second sub streams) that meet a congestion control condition in sub streams other than the first sub stream in a plurality of sub streams.

Specifically, a method for determining the first sub stream set by the first device is as follows: The first device monitors, based on indication of the ECE identifier in the first acknowledgement packet, the sub streams other than the first sub stream in the plurality of sub streams transmitted on a plurality of transmission paths between the first device and the second device, and then groups, into one sub stream set, namely, the first sub stream set, the first sub stream and the sub streams that meet the congestion control condition in these other sub streams. These sub streams that meet the congestion control condition may be bandwidth-shared sub streams to a specific degree. To be specific, in this embodiment of the present disclosure, a plurality of bandwidth-shared sub streams can be grouped into one sub stream set to a specific degree, and congestion control can be performed on the sub streams in the sub stream set. In this way, a congestion control effect can be significantly improved.

Optionally, in this embodiment of the present disclosure, the congestion control condition may be at least one of the following A, B, and C:

A. A delay of a sub stream is greater than a preset delay threshold;

B. A packet loss event occurs in the sub stream; and

C. An acknowledgement packet of a data packet of the sub stream is received, and the acknowledgement packet of the data packet of the sub stream includes the ECE identifier.

Optionally, in this embodiment of the present disclosure, the sub streams that meet the congestion control condition may include at least one of the following A1, B1, and C1:

A1. A sub stream whose delay exceeds the preset delay threshold and that is in the sub streams other than the first sub stream in the plurality of sub streams transmitted on the plurality of transmission paths between the first device and the second device;

B1. A sub stream on which a packet loss event occurs and that is in the sub streams other than the first sub stream in the plurality of sub streams transmitted on the plurality of transmission paths between the first device and the second device; and C1. A sub stream in which a data packet is located, where the first device receives an acknowledgement packet that is of the data packet and that includes an ECE identifier, and the sub stream in which the data packet is located is a sub stream in the sub streams other than the first sub stream in the plurality of sub streams transmitted on the plurality of transmission paths between the first device and the second device.

In this embodiment of the present disclosure, the three congestion control conditions all can reflect congestion statuses of the plurality of sub streams transmitted on the plurality of transmission paths between the first device and the second device. Therefore, the routing device may determine, based on at least one of the three congestion control conditions, a sub stream that may be congested.

Optionally, in the congestion control method provided in this embodiment of the present disclosure, S110 may be specifically implemented by using S110a to S110c.

S110a. The first device monitors sub streams other than a first sub stream in a plurality of sub streams in a preset time period.

In this embodiment of the present disclosure, the first device receives the first acknowledgement packet, and based on indication of the ECE identifier in the first acknowledgement packet, starts to monitor, in the preset time period, data packets in the sub streams other than the first sub stream in the plurality of sub streams transmitted on the plurality of transmission paths between the first device and the second device, to determine whether the sub streams in which the data packets are located are congested.

Figure 5:
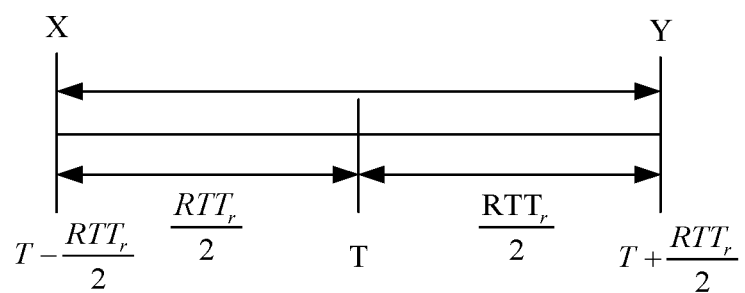
FIG. 5 is a schematic diagram of a preset time period according to an embodiment of the present disclosure.

Optionally, in this embodiment of the present disclosure, a value of the preset time period may be equal to a round trip delay of the first sub stream. Specifically, the preset time period may be a time period formed by respectively extending forward and backward for a same time from a moment at which the first device receives the first acknowledgement packet including the ECE identifier. For example, as shown in FIG. 5, assuming that the value of the preset time period is the round trip delay $RTT_r$ of the first sub stream, and the first device receives, at a moment T, the first acknowledgement packet including the ECE identifier, the preset time period may be represented as a time period formed by respectively extending forward and backward for $$\frac{RTT_r}{2}$$

from the moment T, namely, a time period represented by X to Y shown in FIG. 5.

S110b. The first device determines a plurality of second sub streams.

In this embodiment of the present disclosure, the first device monitors, in the preset time period, the sub streams other than the first sub stream in the plurality of sub streams transmitted on the plurality of transmission paths between the first device and the second device, and determines, as the plurality of second sub streams, the sub streams that meet the congestion control condition in the other sub streams.

S110c. The first device determines the first sub stream and the plurality of second sub streams as the first sub stream set.

In this embodiment of the present disclosure, after determining the plurality of second sub streams, the first device may use the first sub stream and the plurality of second sub streams as the first sub stream set, so that the first device can perform congestion control on sub streams in the set.

S111. The first device performs congestion control on sub streams in the first sub stream set.

In this embodiment of the present disclosure, after determining the first sub stream set, the first device continues to monitor each sub stream in the first sub stream set, and adjusts a send window (the send window is a quantity of data packets that can be transmitted between the first device and the second device within one round trip delay $RTT_r$ of the sub stream) of each sub stream based on a congestion status of the sub stream, to implement congestion control on the sub streams in the first sub stream set.

Optionally, for each sub stream in the first sub stream set, the first device may calculate a current congestion degree of the sub stream in each round trip delay of the sub stream, update the congestion degree of the sub stream, and then adjust a size of a send window based on an updated congestion degree of the sub stream, to implement congestion control on the sub stream, and then implement congestion control on each sub stream in the first sub stream set.

Optionally, in this embodiment of the present disclosure, the first device may use a set congestion control method to perform congestion control on the sub streams in the first sub stream set. A sub stream (hereinafter referred to as a sub stream r) in the first sub stream set is used as an example. The set congestion control method may include three steps S1 to S3.

S1. The first device calculates a current congestion degree of the sub stream r.

Optionally, a method for calculating the current congestion degree of the sub stream r is as follows:

$$T_r = p_1/p$$

In the foregoing formula, $T_r$ is the current congestion degree of the sub stream r, $p_1$ is a quantity of acknowledgement packets in the sub stream r that include the ECE identifier and that are received by the first device in one round trip delay of the sub stream r, and p is a quantity of data packets in the sub stream r that are received by the second device in one round trip delay of the sub stream r.

S2. The first device updates the congestion degree of the sub stream r.

Optionally, a method for updating the congestion degree of the sub stream r is as follows:

$$\beta_r' = g*T_r \pm (1-g)*\beta_r$$

In the foregoing formula, $\beta_r'$ is an updated congestion degree of the sub stream r, g is a weight of the congestion degree, and $\beta_r$ is an updated congestion degree of the sub stream r in a previous round trip delay.

S3. The first device adjusts a size of a send window of the sub stream r.

Specifically, that the first device adjusts a size of a send window of the sub stream r includes: decreasing the size of the send window of the sub stream r, in other words, performing the following step S3a; or increasing the size of the send window of the sub stream r, in other words, performing the following step S3b.

S3a. The first device decreases the size of the send window of the sub stream r.

Optionally, in this embodiment of the present disclosure, when a packet loss event occurs in the sub stream r in the first sub stream set, in other words, the sub stream r may be congested, the first device may decrease the send window $w_r$ of the sub stream r.

Optionally, a method for decreasing the send window $w_r$ of the sub stream r is as follows:

$$w_r' = w_r - \frac{\beta_r'}{2} * w_r$$

In the foregoing formula, $w_r'$ is a decreased send window of the sub stream r, $w_r$ is a current send window of the sub stream r, and $\beta_r'$ is an updated congestion degree of the sub stream r in a current round trip delay.

In this embodiment of the present disclosure, the first device decreases send windows of the sub streams in the first sub stream set, so that a data packet sending speed of the first device can be reduced, to implement congestion control on the sub streams in the first sub stream set.

It should be noted that, in this embodiment of the present disclosure, that a packet loss event occurs in the sub stream r may be that a preset quantity of data packets in the sub stream r are lost. The preset quantity may be 1 or another preset value. This is not limited in this embodiment of the present disclosure.

S3b. The first device increases the size of the send window of the sub stream r.

Optionally, in this embodiment of the present disclosure, when no packet loss event occurs in the sub stream r in the first sub stream set, in other words, the sub stream r is not congested, the first device may increase the send window $w_r$ of the sub stream r.

Optionally, a method for increasing the send window $w_r$ of the sub stream r is as follows:

$$w_r' = w_r + \frac{\partial r}{w_s}$$

$$\partial r = \min\left(\frac{1-\beta_r'}{\sum_{r\in s} 1-\beta_r'}, \frac{1}{w_r}\right)$$

In the foregoing formulas, $w_r'$ is an increased send window of the sub stream r, $w_s$ is a sum of send windows of all the sub streams in the first sub stream set, $w_r$ is a current send window of the sub stream r, $\beta_r'$ is an updated congestion degree of the sub stream r in a current delay, and $r \in S$ indicates that the sub stream r is one of the s sub streams in the first sub stream set.

In this embodiment of the present disclosure, the first device increases the send window of the sub stream r in the first sub stream set, so that a data packet sending speed of the first device can be increased, to implement congestion control on the sub stream r.

In the congestion control method provided in this embodiment of the present disclosure, when data transmission is performed between the first device and the second device by using the MPTCP, congestion control is performed on the plurality of sub streams transmitted on the plurality of transmission paths between the first device and the second device. Specifically, the first device sends the first data packet to the routing device. After receiving the first data packet, the routing device determines that the average queue length of the data packet queue is greater than or equal to the first preset threshold and is less than or equal to the second preset threshold. Then, the routing device makes the congestion mark for the first data packet, adds the first data packet to the data packet queue, and sends the first data packet to the second device. After receiving the first data packet with the congestion mark, the second device sets the ECE identifier in the first acknowledgement packet with which the second device is to reply to the first device, and then sends the first acknowledgement packet to the first device. After the first device receives the first acknowledgement packet including the ECE identifier, the first device starts to monitor the plurality of sub streams other than the first sub stream in the plurality of sub streams transmitted on the plurality of transmission paths, groups, into one set, the first sub stream and the sub streams that meet the congestion control condition in the plurality of other sub streams, and then performs congestion control on sub streams in the set. In comparison with the prior art, in this embodiment of the present disclosure, sub streams that meet the congestion control condition in the plurality of sub streams transmitted on the plurality of transmission paths between the first device and the second device may be grouped into one sub stream set. These sub streams that meet the congestion control condition may be bandwidth-shared sub streams to a specific degree. To be specific, in this embodiment of the present disclosure, a plurality of bandwidth-shared sub streams can be grouped into one sub stream set to a specific degree, and congestion control can be performed on the sub streams in the sub stream set. In this way, a congestion control effect can be significantly improved.

Figure 6A:
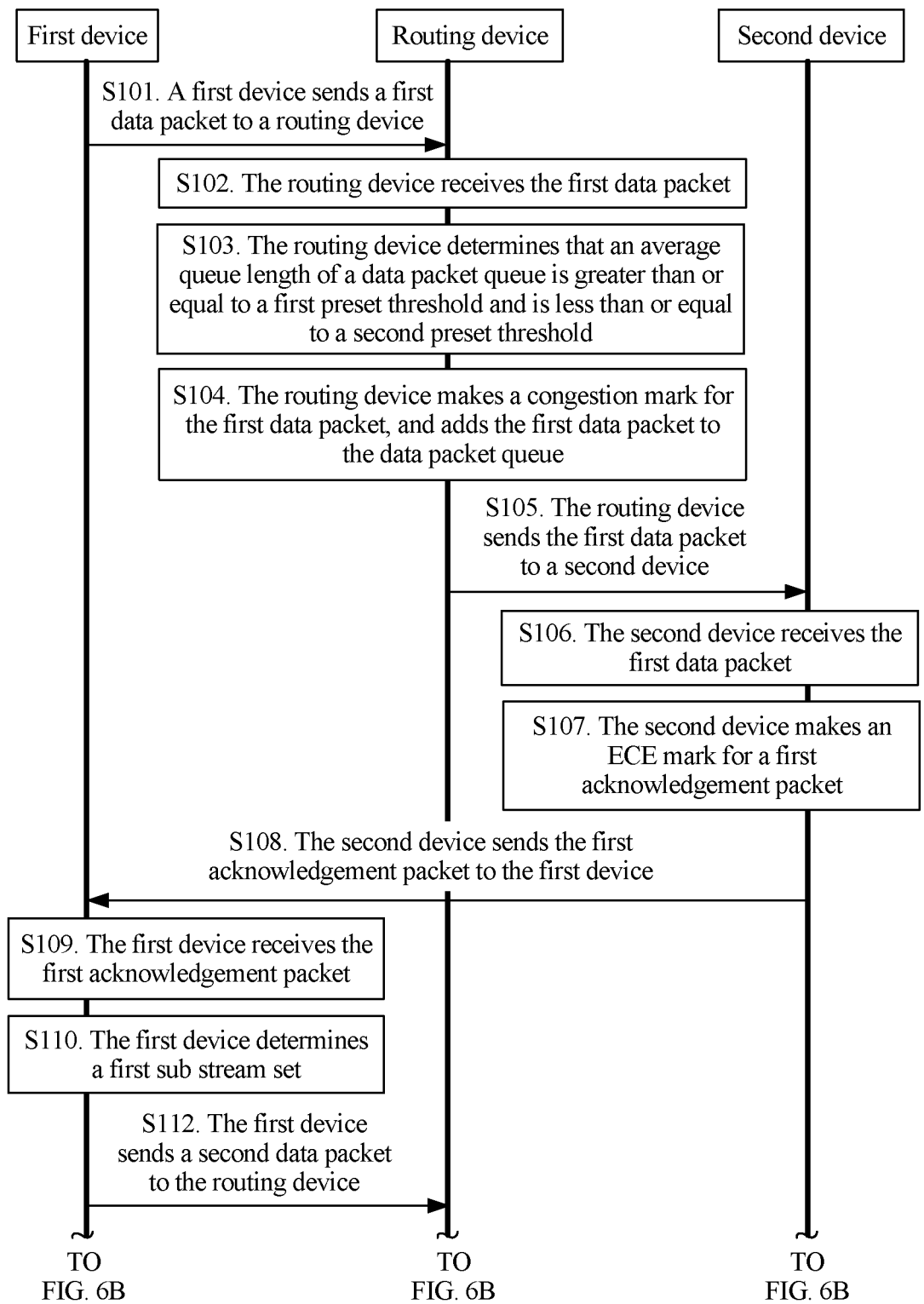
FIG. 6A and FIG. 6B are a schematic diagram 2 of a congestion control method according to an embodiment of the present disclosure.
Figure 6B:
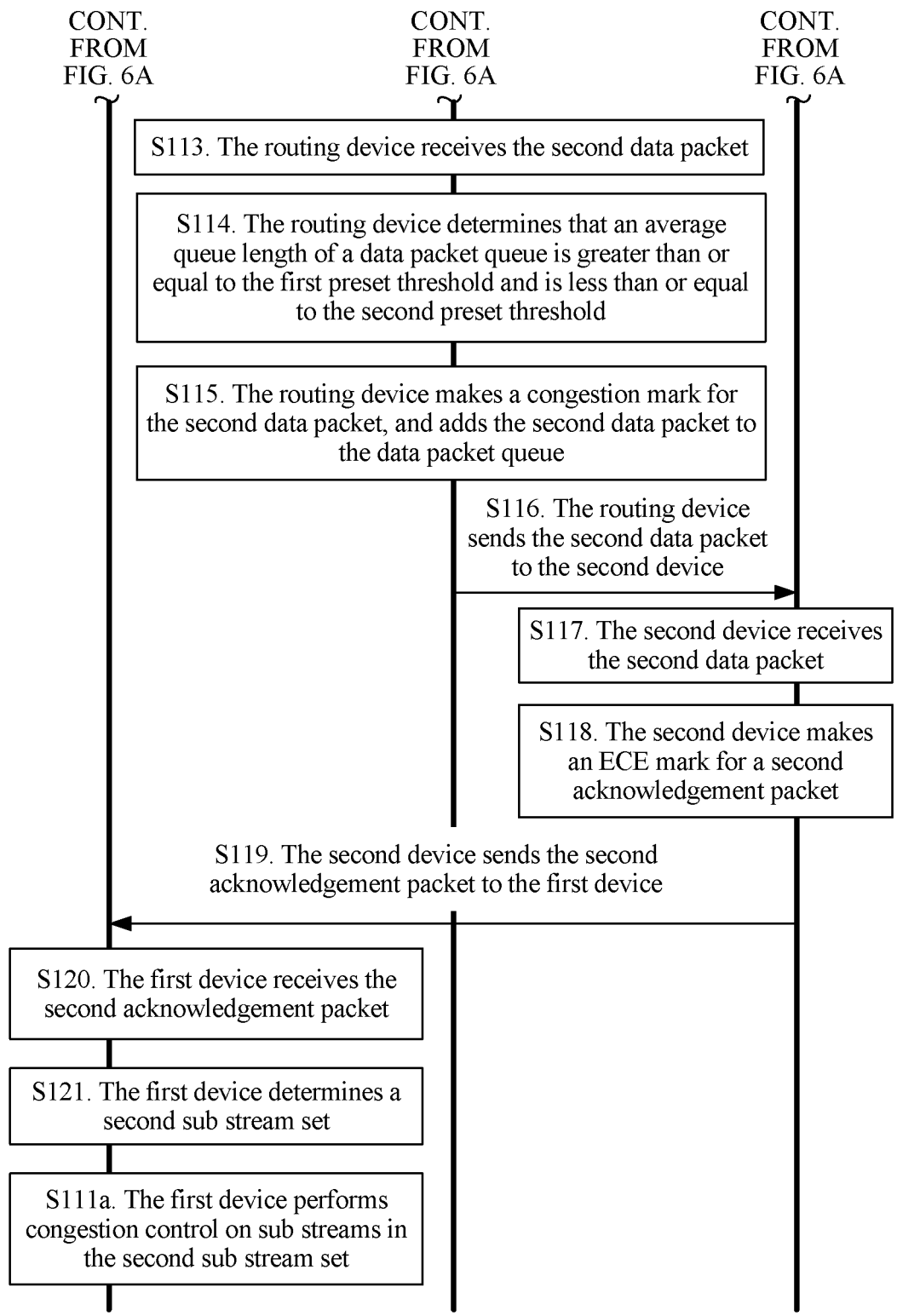

Optionally, with reference to FIG. 4, as shown in FIG. 6A and FIG. 6B, an embodiment of the present disclosure provides a congestion control method. After S110, the method may further include the following steps.

S112. The first device sends a second data packet to the routing device.

In this embodiment of the present disclosure, the first device successively sends a plurality of to-be-transmitted data packets to the second device by using the routing device. The plurality of data packets include the second data packet.

S113. The routing device receives the second data packet.

S114. The routing device determines that an average queue length of a data packet queue is greater than or equal to the first preset threshold and is less than or equal to the second preset threshold.

S115. The routing device makes a congestion mark for the second data packet, and adds the second data packet to the data packet queue.

S116. The routing device sends the second data packet to the second device.

S117. The second device receives the second data packet.

In this embodiment of the present disclosure, after the second device receives the second data packet, the second device needs to reply to the first device with an acknowledgement packet, namely, a second acknowledgement packet, of the second data packet.

S118. The second device makes an ECE mark for a second acknowledgement packet.

S119. The second device sends the second acknowledgement packet to the first device.

For detailed descriptions of S112 to S119, refer to related descriptions of S101 to S108. Details are not described herein.

It should be noted that a sequence of performing S101 to S108 and S112 to S119 is not limited in this embodiment of the present disclosure. In other words, in this embodiment of the present disclosure, S101 to S108 may be performed before S112 to S119, or S112 to S119 may be performed before S101 to S108, or S101 to S108 and S112 to S119 may be simultaneously performed.

Optionally, as shown in FIG. 6A and FIG. 6B, after S108, and before the performing congestion control on sub streams in the first sub stream set, the congestion control method provided in the present disclosure may further include the following steps.

S120. The first device receives the second acknowledgement packet.

For detailed descriptions of S120, refer to related descriptions of S109. Details are not described herein.

S121. The first device determines a second sub stream set based on indication of an ECE identifier in the second acknowledgement packet.

Optionally, with reference to FIG. 6A and FIG. 6B, S121 may be specifically implemented by using S121a to S121c.

S121a. The first device monitors sub streams other than a third sub stream in the first sub stream set in a preset time period.

S121b. The first device determines a plurality of fourth sub streams.

In this embodiment of the present disclosure, the third sub stream is a sub stream in which the second data packet is located. The plurality of fourth sub streams are sub streams that meet a congestion control condition in the sub streams other than the third sub stream in the first sub stream set.

S121c. The first device determines the third sub stream and the plurality of fourth sub streams as the second sub stream set.

For detailed descriptions of S121a to S121c, refer to related descriptions of S110a to S110c. Details are not described herein.

In this embodiment of the present disclosure, a method for determining, by the first device, the second sub stream set from the first sub stream set based on indication of the ECE identifier in the second acknowledgement packet is similar to the method for determining, by the first device based on indication of the ECE identifier in the first acknowledgement packet, the first sub stream set from the plurality of sub streams transmitted on the plurality of transmission paths between the first device and the second device in S110. For detailed descriptions of S121, refer to related descriptions of S110. Details are not described herein.

In this embodiment of the present disclosure, after the first device determines the first sub stream set, the first device may further determine the second sub stream set (the second sub stream set is a subset of the first sub stream set) from the first sub stream set, and perform congestion control on sub streams in the second sub stream set. In this way, the first device can determine, in relatively high accuracy, a sub stream set on which congestion control is to be performed, so that a congestion control effect can be significantly improved.

Optionally, as shown in FIG. 6A and FIG. 6B, S111 may specifically include the following steps.

S111a. The first device performs congestion control on sub streams in the second sub stream set.

In this embodiment of the present disclosure, a method for performing, by the first device, congestion control on the sub streams in the second sub stream set in S111a is similar to the method for performing, by the first device, congestion control on the sub streams in the first sub stream set in S111. For detailed descriptions of S111a, refer to related descriptions of S111. Details are not described herein.

A difference between S111a and S111 lies in different objects on which the first device performs congestion control. An object on which the first device performs congestion control in S111a is the sub streams in the second sub stream set. An object on which the first device performs congestion control in S111 is the sub streams in the first sub stream set.

Optionally, with reference to FIG. 6A and FIG. 6B, the congestion control method provided in this embodiment of the present disclosure may further include the following step:

S122. The first device performs congestion control on a sub stream that is not in the first sub stream set.

In this embodiment of the present disclosure, the sub stream that is not in the first sub stream set includes a sub stream that is other than the sub streams in the first sub stream set and that is in the plurality of sub streams transmitted on the plurality of transmission paths between the first device and the second device.

Optionally, in this embodiment of the present disclosure, the first device may use a separate congestion control method to perform congestion control on the sub stream that is not in the first sub stream set (an example in which congestion control is performed on a sub stream k that is not in the first sub stream set is used for illustration). The separate congestion control method may include: decreasing a size of a send window of the sub stream k, in other words, performing the following step Q1a; or increasing a size of a send window of the sub stream k, in other words, performing the following step Q1b.

Q1a. The first device decreases a size of a send window of the sub stream k.

Optionally, in this embodiment of the present disclosure, when a packet loss event occurs in the sub stream k, in other words, the sub stream k may be congested, the first device may decrease the send window $w_k$ of the sub stream k.

Optionally, a method for decreasing the send window $w_k$ of the sub stream k is as follows:

$$w_k' = w_k - \tfrac{1}{2} * w_k$$

In the foregoing formula, $w_k'$ is a decreased send window of the sub stream k, and $w_k$ is a current send window of the sub stream k.

In this embodiment of the present disclosure, the first device decreases the send window of the sub stream k, so that a data packet sending speed of the first device can be reduced, to implement congestion control on the sub stream k.

Q1b. The first device increases a size of a send window of the sub stream k.

Optionally, in this embodiment of the present disclosure, when the first device learns that no packet loss event occurs in the sub stream k, in other words, the sub stream k is not congested, the first device may increase the send window $w_k$ of the sub stream k.

Optionally, a method for increasing the send window $w_k$ of the sub stream k is as follows:

$$w_k' = w_k + \frac{1}{w_k}$$

In the foregoing formula, $w_k'$ is an increased send window of the sub stream k, and $w_k$ is a send window, before the increase, of the sub stream k.

In this embodiment of the present disclosure, the first device increases the send window of the sub stream k, so that a data packet sending speed of the first device can be increased, to implement congestion control on the sub stream k.

It should be noted that a sequence of performing S111 and S122 is not limited in this embodiment of the present disclosure. In other words, in this embodiment of the present disclosure, S111 may be performed before S122, or S122 may be performed before S111, or S111 and S122 may be simultaneously performed.

In this embodiment of the present disclosure, the first device may perform congestion control on the sub streams in the first sub stream set, and may further perform congestion control on the sub stream that is not in the first sub stream set. In this way, the first device may perform congestion control on all of the plurality of sub streams transmitted on the plurality of transmission paths between the first device and the second device, so that a congestion control effect can be more significantly improved.

Optionally, with reference to FIG. 6A and FIG. 6B, the congestion control method provided in the present disclosure may further include the following step:

S123. The first device performs congestion control on a sub stream that is not in the second sub stream set.

In this embodiment of the present disclosure, the sub stream that is not in the second sub stream set includes a sub stream that is other than the sub streams in the second sub stream set and that is in the plurality of sub streams. A method for performing, by the first device, congestion control on the sub stream that is not in the second sub stream set is similar to the method for performing, by the first device, congestion control on the sub stream that is not in the first sub stream set in S122. For detailed descriptions of S123, refer to related descriptions of S122. Details are not described herein.

A difference between S123 and S122 lies in different objects on which the first device performs congestion control. An object on which the first device performs congestion control in S123 is the sub stream that is not in the second sub stream set. An object on which the first device performs congestion control in S122 is the sub stream that is not in the first sub stream set.

It should be noted that, in this embodiment of the present disclosure, S111 and S122 may be simultaneously performed, or S111a and S123 may be simultaneously performed.

In this embodiment of the present disclosure, the first device may perform congestion control on the sub streams in the second sub stream set, and may further perform congestion control on the sub stream that is not in the second sub stream set. In this way, the first device may perform congestion control on all of the plurality of sub streams transmitted on the plurality of transmission paths between the first device and the second device, so that a congestion control effect can be more significantly improved.

Optionally, with reference to FIG. 4 or FIG. 6A and FIG. 6B, in the congestion control method provided in the present disclosure, before the first device sends a data packet (for example, the first data packet or the second data packet) to the routing device, the method may further include the following step:

S124. The first device marks a to-be-sent data packet.

In this embodiment of the present disclosure, before sending the data packet to the routing device, the first device may first mark the to-be-sent data packet, to be specific, set an ECN identifier of the data packet to an ECN-supported identifier. The ECN-supported identifier is used to indicate, to the routing device, that the data packet supports an ECN function. The routing device sends the data packet with the ECN-supported identifier to the second device. After receiving the data packet, the second device sends an acknowledgement packet (for example, the first acknowledgement packet or the second acknowledgement packet) to the first device. After receiving the acknowledgement packet, the first device may learn that a sub stream in which the data packet is located may be congested, and determine, from the plurality of sub streams based on indication of an ECE identifier in the acknowledgement packet based on the congestion control condition, sub streams (for example, the sub streams in the first sub stream set or the sub streams in the second sub stream set) that may be congested, so that the first device implements congestion control on these sub streams that may be congested.

In the congestion control method provided in this embodiment of the present disclosure, when data transmission is performed between the first device and the second device by using the MPTCP, congestion control is performed on the plurality of sub streams transmitted on the plurality of transmission paths between the first device and the second device. Specifically, the first device sends the first data packet to the routing device. After receiving the first data packet, the routing device determines that the average queue length of the data packet queue is greater than or equal to the first preset threshold and is less than or equal to the second preset threshold. Then, the routing device makes the congestion mark for the first data packet, adds the first data packet to the data packet queue, and sends the first data packet to the second device. After receiving the first data packet with the congestion mark, the second device sets the ECE identifier in the first acknowledgement packet with which the second device is to reply to the first device, and then sends the first acknowledgement packet to the first device. After the first device receives the first acknowledgement packet including the ECE identifier, the first device starts to monitor the plurality of sub streams other than the first sub stream in the plurality of sub streams transmitted on the plurality of transmission paths, groups, into one set, the first sub stream and the sub streams that meet the congestion control condition in the plurality of other sub streams, and then performs congestion control on sub streams in the set. In comparison with the prior art, in this embodiment of the present disclosure, sub streams that meet the congestion control condition in the plurality of sub streams transmitted on the plurality of transmission paths between the first device and the second device may be grouped into one sub stream set. These sub streams that meet the congestion control condition may be bandwidth-shared sub streams to a specific degree. To be specific, in this embodiment of the present disclosure, a plurality of bandwidth-shared sub streams can be grouped into one sub stream set to a specific degree, and congestion control can be performed on the sub streams in the sub stream set. In this way, a congestion control effect can be significantly improved, to further improve MPTCP transmission performance.

The foregoing mainly describes the solutions provided in the embodiments of the present disclosure from a perspective of interaction between devices. It may be understood that, to implement the foregoing functions, devices such as the first device, the second device, and the routing device each include a corresponding hardware structure and/or software module for performing each function. A person of ordinary skill in the art should be easily aware that, the units and algorithm steps in the examples described with reference to the embodiments disclosed in this specification can be implemented in the present disclosure in a form of hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present disclosure.

In the embodiments of the present disclosure, the first device, the second device, and the routing device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that the module division in the embodiments of the present disclosure is an example, and is merely logical function division. There may be another division manner during actual implementation.

Figure 7:
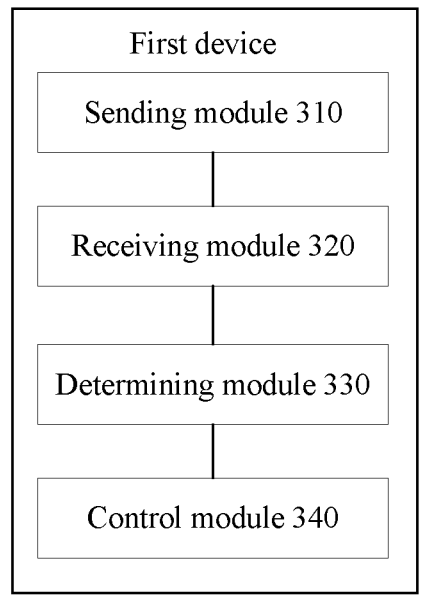
FIG. 7 is a schematic structural diagram 1 of a first device according to an embodiment of the present disclosure.

An embodiment of the present disclosure provides a device. The device may be a first device. When each function module is obtained through division based on each corresponding function, FIG. 7 is a possible schematic structural diagram of the first device in the foregoing embodiments. The first device includes a sending module 310, a receiving module 320, a determining module 330, and a control module 340. The sending module 310 is configured to support the first device in performing S101 and S112 in the foregoing method embodiments. The receiving module 320 is configured to support the first device in performing S109 and S120 in the foregoing method embodiments. The determining module 330 is configured to support the first device in performing S110 (including S110a to S110c), S121 (including S121a to S121c), and S124 in the foregoing method embodiments. The control module 340 is configured to support the first device in performing S111, S111a, S112, S122, and S123 in the foregoing method embodiments. All related content of each step in the foregoing method embodiments may be cited in function descriptions of a corresponding function module, and details are not described herein.

Figure 8:
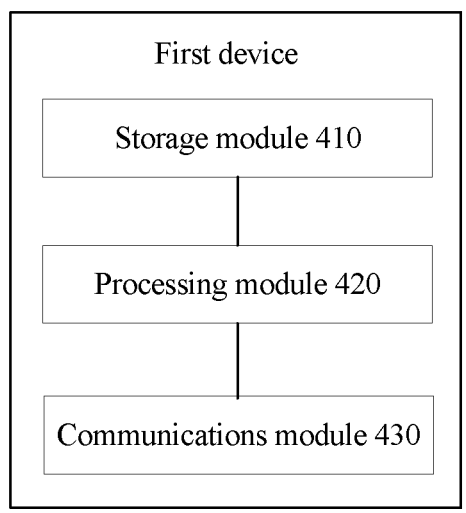
FIG. 8 is a schematic structural diagram 2 of a first device according to an embodiment of the present disclosure.

When an integrated unit is used, FIG. 8 is a possible schematic structural diagram of the first device in the foregoing embodiments. The first device includes a processing module 420 and a communications module 430. The processing module 420 is configured to control and manage an action of the first device. For example, the processing module 420 is configured to support the first device in performing S110 (including S110a to S110c), S111, S111a, S121 (including S121a to S121c), S112, and S122 to S124 in the foregoing method embodiments, and/or is configured for another process of the technology described in this specification. The communications module 430 is configured to support communication between the first device and another network entity, for example, communication with the routing device and the second device shown in FIG. 1, FIG. 4, or FIG. 6A and FIG. 6B. As shown in FIG. 8, the first device may further include a storage module 410, configured to store program code and data of the first device. This is not specifically limited in this embodiment of the present disclosure.

The processing module 420 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processing module 420 may implement or execute various example logical blocks, modules, and circuits that are described with reference to the content disclosed in the present disclosure. The processor may alternatively be a combination implementing a computing function, for example, a combination including one or more microprocessors, or a combination of a DSP and a microprocessor. The processor or the controller may be the processor 160 of the mobile phone shown in FIG. 2. The communications module 430 may be a transceiver, a transceiver circuit, a communications interface, or the like.

The transceiver, the transceiver circuit, or the communications interface may be the radio frequency circuit 110 of the mobile phone shown in FIG. 2. The storage module 410 may be a memory. The memory may be the memory 120 of the mobile phone shown in FIG. 2.

For details of another component included in the first device in this embodiment of the present disclosure, refer to related descriptions of the structure of the mobile phone shown in FIG. 2. Details are not described herein again.

An embodiment of the present disclosure further provides a computer-readable storage medium. The computer-readable storage medium stores one or more programs. The one or more programs include an instruction. When a processor of the foregoing first device executes the instruction, the first device performs each step performed by the first device in the method procedures shown in the foregoing method embodiments.

Figure 9:
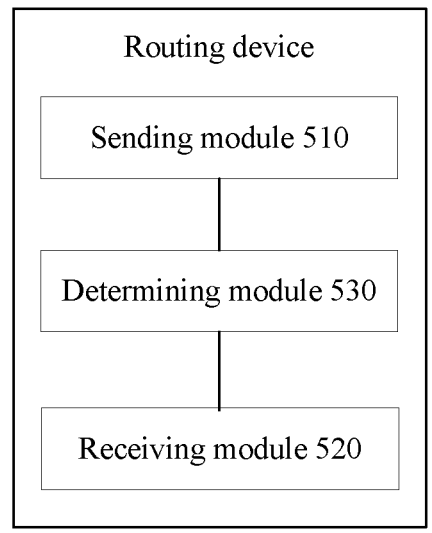
FIG. 9 is a schematic structural diagram 1 of a routing device according to an embodiment of the present disclosure.

An embodiment of the present disclosure provides a routing device. When each function module is obtained through division based on each corresponding function, FIG. 9 is a possible schematic structural diagram of the routing device in the foregoing embodiments. The routing device includes a sending module 510, a receiving module 520, and a determining module 530. The sending module 510 is configured to support the routing device in performing S105 and S116 in the foregoing method embodiments. The receiving module 520 is configured to support the routing device in performing S102 and S113 in the foregoing method embodiments. The determining module 530 is configured to support the routing device in performing S103, S104, S114, and S115 in the foregoing method embodiments. All related content of each step in the foregoing method embodiments may be cited in function descriptions of a corresponding function module, and details are not described herein.

Figure 10:
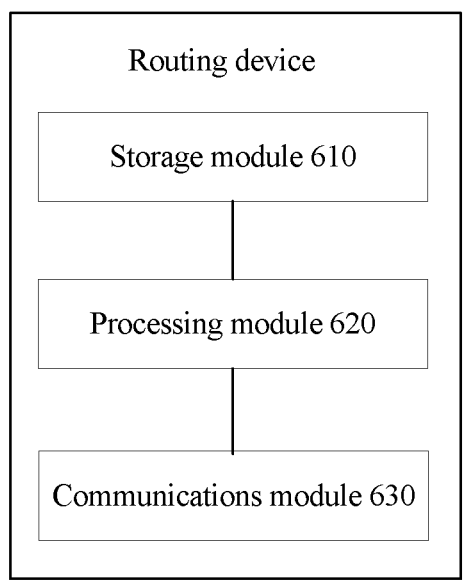
FIG. 10 is a schematic structural diagram 2 of a routing device according to an embodiment of the present disclosure.

When an integrated unit is used, FIG. 10 is a possible schematic structural diagram of the routing device in the foregoing embodiments. The routing device includes a processing module 620 and a communications module 630. The processing module 620 is configured to control and manage an action of the routing device. For example, the processing module 620 is configured to support the routing device in performing S103, S104, S114, and S115 in the foregoing method embodiments, and/or is configured for another process of the technology described in this specification. The communications module 630 is configured to support communication between the routing device and another network entity, for example, communication with the first device and the second device shown in FIG. 1, FIG. 4, or FIG. 6A and FIG. 6B. As shown in FIG. 10, the routing device may further include a storage module 610, configured to store program code and data of the routing device. This is not specifically limited in this embodiment of the present disclosure.

The processing module 620 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 620 may implement or execute various example logical blocks, modules, and circuits that are described with reference to the content disclosed in the present disclosure. The processor may alternatively be a combination implementing a computing function, for example, a combination including one or more microprocessors, or a combination of a DSP and a microprocessor. The processor or the controller may be the processor 210 of the routing device shown in FIG. 3. The communications module 630 may be a transceiver, a transceiver circuit, or a communications interface. The transceiver, the transceiver circuit, or the communications interface may be the interface 230 of the routing device shown in FIG. 3. The storage module 610 may be a memory. The memory may be the memory 220 of the routing device shown in FIG. 3.

An embodiment of the present disclosure further provides a computer-readable storage medium. The computer-readable storage medium stores one or more programs. The one or more programs include an instruction. When a processor of the foregoing routing device executes the instruction, the routing device performs each step performed by the routing device in the method procedures shown in the foregoing method embodiments.

Figure 11:
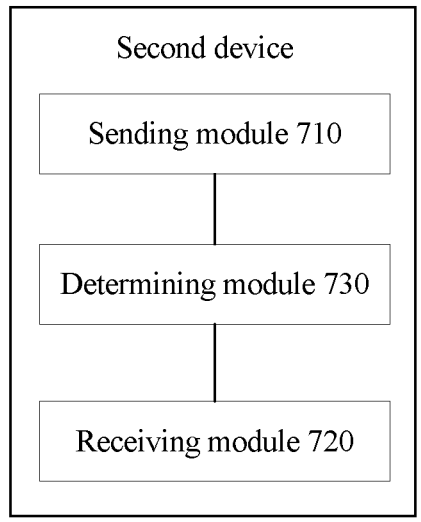
FIG. 11 is a schematic structural diagram 1 of a second device according to an embodiment of the present disclosure.

An embodiment of the present disclosure provides a device. The device may be a second device. When each function module is obtained through division based on each corresponding function, FIG. 11 is a possible schematic structural diagram of the second device in the foregoing embodiments. The second device includes a sending module 710, a receiving module 720, and a determining module 730. The sending module 710 is configured to support the second device in performing S108 and S119 in the foregoing method embodiments. The receiving module 720 is configured to support the second device in performing S106 and S117 in the foregoing method embodiments. The determining module 730 is configured to support the second device in performing S107 and S118 in the foregoing method embodiments. All related content of each step in the foregoing method embodiments may be cited in function descriptions of a corresponding function module, and details are not described herein.

Figure 12:
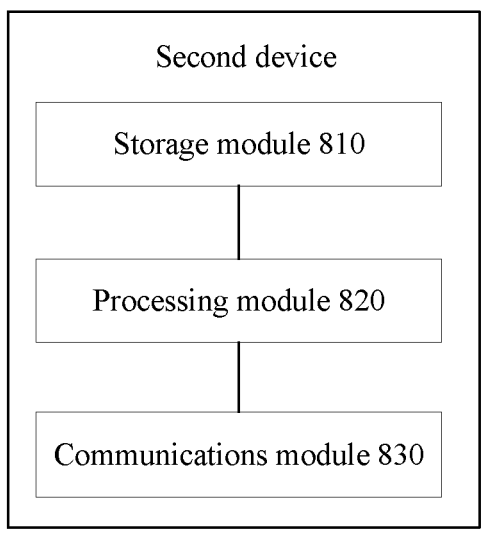
FIG. 12 is a schematic structural diagram 2 of a second device according to an embodiment of the present disclosure.

When an integrated unit is used, FIG. 12 is a possible schematic structural diagram of the second device in the foregoing embodiments. The second device includes a processing module 820 and a communications module 830. The processing module 820 is configured to control and manage an action of the second device. For example, the processing module 820 is configured to support the second device in performing S107 and S118 in the foregoing method embodiments, and/or is configured for another process of the technology described in this specification. The communications module 830 is configured to support communication between the second device and another network entity, for example, communication with the routing device and the first device shown in FIG. 1, FIG. 4, or FIG. 6A and FIG. 6B. The second device may further include a storage module 810, configured to store program code and data of the second device. This is not specifically limited in this embodiment of the present disclosure.

The processing module 820 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 820 may implement or execute various example logical blocks, modules, and circuits that are described with reference to the content disclosed in the present disclosure. The processor may alternatively be a combination implementing a computing function, for example, a combination including one or more microprocessors, or a combination of a DSP and a microprocessor. The processor or the controller may be the processor 160 of the mobile phone shown in FIG. 2. The communications module 830 may be a transceiver, a transceiver circuit, a communications interface, or the like. The transceiver, the transceiver circuit, or the communications interface may be the radio frequency circuit 110 of the mobile phone shown in FIG. 2. The storage module 810 may be a memory. The memory may be the memory 120 of the mobile phone shown in FIG. 2.

In the embodiments of the present disclosure, the first device and the second device may be a same type of mobile phone. Therefore, for details of each component included in the second device in the embodiments of the present disclosure, refer to related descriptions of the structure of the mobile phone shown in FIG. 2, and details are not described herein again.

An embodiment of the present disclosure further provides a computer-readable storage medium. The computer-readable storage medium stores one or more programs. The one or more programs include an instruction. When a processor of the foregoing second device executes the instruction, the second device performs each step performed by the second device in the method procedures shown in the foregoing method embodiments.

An embodiment of the present disclosure provides a communications system. The communications system may include a first device, a routing device, and a second device. For details of the communications system provided in this embodiment of the present disclosure, refer to the schematic architectural diagram of the communications system shown in FIG. 1. The first device may be the transmit end 10 shown in FIG. 1. The routing device may be the routing device 12 shown in FIG. 1. The second device may be the receive end 11 shown in FIG. 1. For detailed descriptions of the first device, the routing device, and the second device, refer to related description in the foregoing method embodiments and the apparatus embodiments. Details are not described herein again.

In the communications system provided in this embodiment of the present disclosure, when data transmission is performed between the first device and the second device by using the MPTCP, congestion control is performed on a plurality of sub streams transmitted on a plurality of transmission paths between the first device and the second device. Specifically, the first device sends a first data packet to the routing device. After receiving the first data packet, the routing device determines that an average queue length of a data packet queue is greater than or equal to a first preset threshold and is less than or equal to a second preset threshold. Then, the routing device makes a congestion mark for the first data packet, adds the first data packet to the data packet queue, and sends the first data packet to the second device. After receiving the first data packet with the congestion mark, the second device sets an ECE identifier in a first acknowledgement packet with which the second device is reply to the first device, and then sends the first acknowledgement packet to the first device. After the first device receives the first acknowledgement packet including the ECE identifier, the first device starts to monitor a plurality of sub streams other than a first sub stream in the plurality of sub streams transmitted on the plurality of transmission paths, groups, into one set, the first sub stream and sub streams that meet a congestion control condition in the plurality of other sub streams, and then performs congestion control on sub streams in the set. In comparison with the prior art, in this embodiment of the present disclosure, sub streams that meet the congestion control condition in the plurality of sub streams transmitted on the plurality of transmission paths between the first device and the second device may be grouped into one sub stream set. These sub streams that meet the congestion control condition may be bandwidth-shared sub streams to a specific degree. To be specific, in this embodiment of the present disclosure, a plurality of bandwidth-shared sub streams can be grouped into one sub stream set to a specific degree, and congestion control can be performed on the sub streams in the sub stream set. In this way, a congestion control effect can be significantly improved.

The methods or algorithm steps described with reference to the content disclosed in the present disclosure may be implemented by hardware, or may be implemented by executing a software instruction by a processor. The software instruction may include a corresponding software module. The software module may be stored in a random access memory, a flash, a read-only memory, an erasable programmable read-only memory, an electrically erasable programmable read-only memory, a register, a hard disk, a removable hard disk, a compact disc read-only memory, or a storage medium in any other forms well-known in the art. An example storage medium is coupled to the processor, so that the processor can read information from the storage medium, and can write information into the storage medium. Certainly, the storage medium may be a part of the processor. The processor and the storage medium may be located in an ASIC. In addition, the ASIC may be located in the first device, the routing device, and the second device. Certainly, the processor and the storage medium may exist in the first device, the routing device, and the second device as discrete components.

A person skilled in the art should be aware that in one or more of the foregoing examples, the functions described in the present disclosure may be implemented by hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another place. The storage medium may be any available medium accessible to a general-purpose or a dedicated computer.

Based on the foregoing descriptions of the implementations, a person skilled in the art may clearly understand that, for the purpose of convenient and brief description, division of the foregoing function modules is used as an example for illustration. During actual application, the foregoing functions can be allocated to different modules for implementation based on a requirement, to be specific, an inner structure of an apparatus is divided into different function modules to implement all or some of the foregoing described functions. For a detailed working process of the foregoing described system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiments are merely examples. For example, the module or unit division is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, to be specific, may be located in one place, or may be distributed on a plurality of network units. Some or all of the units may be selected based on an actual requirement to achieve the objectives of the solutions in the embodiments.

In addition, function units in the embodiments of the present disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in the present disclosure essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the method described in the embodiments of the present disclosure. The storage medium includes various media that can store program code, such as a flash memory, a removable hard disk, a read-only memory, a random access memory, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A congestion control method performed on a first device, the method comprising:
sending a first data packet to a routing device, wherein the first data packet is a data packet of a first sub stream of a plurality of sub streams, and wherein the plurality of sub streams are transmitted on a plurality of transmission paths between the first device and a second device;
receiving a first acknowledgement packet from the second device, wherein the first acknowledgement packet comprises an explicit congestion notification echo (ECE) identifier that is used to instruct the first device to perform a congestion control, wherein the first acknowledgement packet is an acknowledgement packet of the first data packet;
determining a first sub stream set, from the plurality of sub streams, based on an indication of the ECE identifier in the first acknowledgement packet, wherein the first sub stream set comprises the first sub stream and a plurality of second sub streams, wherein the first sub stream differs from the plurality of second sub streams, and wherein the sub streams meet a congestion control condition in sub streams, wherein the congestion control condition is that a packet loss event occurs in the corresponding sub streams of the plurality of second sub streams; and performing the congestion control on the first sub stream set comprising:
the first sub stream, and
the plurality of second sub streams,
wherein, for each sub stream r in the first sub stream set, operations are executed for performing the congestion control on the first sub stream and the plurality of second sub streams in the first sub stream set as follows:
calculating a current congestion degree of the sub stream r by using the following formula:

$T_r = p_1/p$, where:
$T_r$ is a current congestion degree of the sub stream r,
$p_1$ is a quantity of acknowledgement packets, in the sub stream r, that include the ECE identifier and that are received by the first device in a current round trip delay period of the sub stream r, and
p is a quantity of data packets in the sub stream r that are sent by the first device in the current round trip delay period of the sub stream r;
updating a congestion degree of the sub stream r by using the following formula $\beta_r' = g*T_r \pm (1-g)*\beta_r$, where:
$\beta_r'$ is the updated congestion degree of the sub stream r in the current round trip delay period,
g is a weight of the current congestion degree, and
$\beta_r$ an updated congestion degree of the sub stream r in a previous round trip delay period;
adjusting a size of a send window of the sub stream r by using the following formula:

$$w_r' = w_r - \frac{\beta_r'}{2} * w_r,$$

where:
$w_r'$ is a decreased send window size of the sub stream r,
$w_r$ is a current send window size of the sub stream r, and
$\beta_r'$ is the updated congestion degree of the sub stream r in the current round trip delay period, and
the send window is a quantity of data packets that can be transmitted to the second device in one round trip delay period of the sub stream r.

2. The method according to claim 1, wherein the determining the first sub stream set comprises:
monitoring sub streams other than the first sub stream in the plurality of sub streams in a preset time period based on the indication of the ECE identifier;
determining as the plurality of second sub streams, the sub streams that meet the congestion control condition in sub streams other than the first sub stream in the plurality of sub streams; and
determining the first sub stream and the plurality of second sub streams as the first sub stream set.

3. A device, comprising:
a processor, and
a non-transitory computer readable medium including computer-executable instructions that, when executed by the processor, facilitate the device carrying out a method comprising:
sending a first data packet to a routing device, wherein the first data packet is a data packet of a first sub stream of a plurality of sub streams, and wherein the plurality of sub streams are transmitted on a plurality of transmission paths between the first device and a second device;
receiving a first acknowledgement packet from the second device, wherein the first acknowledgement packet comprises an explicit congestion notification echo (ECE) identifier that is used to instruct the first device to perform a congestion control, wherein the first acknowledgement packet is an acknowledgement packet of the first data packet;
determining a first sub stream set, from the plurality of sub streams, based on an indication of the ECE identifier in the first acknowledgement packet, wherein the first sub stream set comprises the first sub stream and a plurality of second sub streams, wherein the first sub stream differs from the plurality of second sub streams, and wherein the sub streams meet a congestion control condition in sub streams, wherein the congestion control condition is that a packet loss event occurs in the corresponding sub streams of the plurality of second sub streams; and
performing the congestion control on the first sub stream set comprising:
the first sub stream, and
the plurality of second sub streams,
wherein, for each sub stream r in the first sub stream set, operations are executed for performing the congestion control on the first sub stream and the plurality of second sub streams in the first sub stream set as follows:
calculating a current congestion degree of the sub stream r by using the following formula:

$T_r = p_1/p$, where:
$T_r$ is a current congestion degree of the sub stream r,
$p_1$ is a quantity of acknowledgement packets, in the sub stream r, that include the ECE identifier and that are received by the first device in a current round trip delay period of the sub stream r, and
p is a quantity of data packets in the sub stream r that are sent by the first device in the current round trip delay period of the sub stream r;
updating a congestion degree of the sub stream r by using the following formula $\beta_r' = g*T_r \pm (1-g)*\beta_r$, where:
$\beta_r'$ is the updated congestion degree of the sub stream r in the current round trip delay period,
g is a weight of the current congestion degree, and
$\beta_r$ is an updated congestion degree of the sub stream r in a previous round trip delay period;
adjusting a size of a send window of the sub stream r by using the following formula:

$$w'_r = w_r - \frac{\beta'_r}{2} * w_r,$$

where:
W$_{r'}$ is a decreased send window size of the sub stream r,
w$_r$ is a current send window size of the sub stream r, and
β$_{r'}$ is the updated congestion degree of the sub stream r in the current round trip delay period, and
the send window is a quantity of data packets that can be transmitted to the second device in one round trip delay period of the sub stream r.

4. The device according to claim 3, wherein the non-transitory computer-readable medium comprises further instructions such that the method carried out by the physical machine comprises:
monitoring sub streams other than the first sub stream in the plurality of sub streams in a preset time period based on the indication of the ECE identifier received by the receiving module;
determining as the plurality of second sub streams, the sub streams that meet the congestion control condition in the sub streams other than the first sub stream in the plurality of sub streams; and
determining the first sub stream and the plurality of second sub streams as the first sub stream set.

5. A non-transitory computer-readable medium storing computer instructions for execution by one or more processors of a device, wherein the computer instructions instruct the one or more processors to perform the operations of a method comprising:
sending a first data packet to a routing device, wherein the first data packet is a data packet of a first sub stream of a plurality of sub streams, and wherein the plurality of sub streams are transmitted on a plurality of transmission paths between the first device and a second device;
receiving a first acknowledgement packet from the second device, wherein the first acknowledgement packet comprises an explicit congestion notification echo (ECE) identifier that is used to instruct the first device to perform a congestion control, wherein the first acknowledgement packet is an acknowledgement packet of the first data packet;
determining a first sub stream set, from the plurality of sub streams, based on an indication of the ECE identifier in the first acknowledgement packet, wherein the first sub stream set comprises the first sub stream and a plurality of second sub streams, wherein the first sub stream differs from the plurality of second sub streams, and wherein the sub streams meet a congestion control condition in sub streams, wherein the congestion control condition is that a packet loss event occurs in the corresponding sub streams of the plurality of second sub streams; and
performing the congestion control on the first sub stream set comprising:
the first sub stream, and
the plurality of second sub streams, wherein, for each sub stream r in the first sub stream set, operations are executed for performing the congestion control on the first sub stream and the plurality of second sub streams in the first sub stream set as follows:
calculating a current congestion degree of the sub stream r by using the following formula:

$$T_r = p_1/p,$$

where:
T$_r$ is a current congestion degree of the sub stream r,
p$_1$ is a quantity of acknowledgement packets, in the sub stream r, that include the ECE identifier and that are received by the first device in a current round trip delay period of the sub stream r, and
p is a quantity of data packets in the sub stream r that are sent by the first device in the current round trip delay period of the sub stream r,
updating a congestion degree of the sub stream r by using the following formula $$\beta_{r'} = g * T_r \pm (1-g) * \beta_r$$

where:
β$_{r'}$ is the updated congestion degree of the sub stream r in the current round trip delay period;
g is a weight of the current congestion degree, and
β$_r$ is an updated congestion degree of the sub stream r in a previous round trip delay period;
adjusting a size of a send window of the sub stream r by using the following formula:

$$w'_r = w_r - \frac{\beta'_r}{2} * w_r,$$

where:
w$_{r'}$ is a decreased send window size of the sub stream r,
w$_r$ is a current send window size of the sub stream r, and
β$_{r'}$ is the updated congestion degree of the sub stream r in the current round trip delay period, and
the send window is a quantity of data packets that can be transmitted to the second device in one round trip delay period of the sub stream r.

6. The non-transitory computer-readable medium according to claim 5, wherein the determining the first sub stream set comprises:
monitoring sub streams other than the first sub stream in the plurality of sub streams in a preset time period based on the indication of the ECE identifier;
determining as the plurality of second sub streams, the sub streams that meet the congestion control condition in sub streams other than the first sub stream in the plurality of sub streams; and
determining the first sub stream and the plurality of second sub streams as the first sub stream set.

* * * * *